(12) United States Patent
Wu et al.

(10) Patent No.: US 12,344,539 B1
(45) Date of Patent: Jul. 1, 2025

(54) PLASMON-ENHANCED CATALYTIC OZONATION FOR RECALCITRANT WATER POLLUTANT REMOVAL

(71) Applicant: Board of Trustees of the University of Alabama, for and on behalf of the University of Alabama in Huntsville, Huntsville, AL (US)

(72) Inventors: Tingtang Wu, Madison, AL (US); Wenwen Yang, Jiangsu (CN); Yu Lei, Madison, AL (US)

(73) Assignee: Board of Trustees of the University of Alabama, for and on Behalf of The University of Alabama In Huntsville, Huntsville, AL (US)

( * ) Notice: Subject to any disclaimer, the term of this patent is extended or adjusted under 35 U.S.C. 154(b) by 321 days.

(21) Appl. No.: 17/701,443

(22) Filed: Mar. 22, 2022

(51) Int. Cl.
| | |
|---|---|
| *C02F 1/78* | (2023.01) |
| *B01J 23/00* | (2006.01) |
| *B01J 23/89* | (2006.01) |
| *B01J 35/23* | (2024.01) |
| *B01J 35/30* | (2024.01) |
| *B01J 35/39* | (2024.01) |

(Continued)

(52) U.S. Cl.
CPC .............. *C02F 1/725* (2013.01); *B01J 23/005* (2013.01); *B01J 23/8986* (2013.01); *B01J 35/23* (2024.01); *B01J 35/39* (2024.01); *B01J 35/394* (2024.01); *C02F 1/30* (2013.01); *C02F 1/78* (2013.01); *C02F 2101/36* (2013.01); *C02F 2101/38* (2013.01); *C02F 2303/18* (2013.01); *C02F 2305/023* (2013.01); *C02F 2305/10* (2013.01)

(58) Field of Classification Search
CPC ...... C02F 1/72; C02F 1/46; C02F 1/70; C02F 1/36; C02F 1/32; C02F 1/30; C02F 1/78; B01J 35/39; B01J 35/23; B01J 23/89
See application file for complete search history.

(56) References Cited

PUBLICATIONS

Plasmon-enhanced Catalytic Ozonation for Efficient Removal of Recalcitrant Water Pollutants; by Wenwen, Engg. 2021, 1 874-883 (Year: 2021).*

(Continued)

*Primary Examiner* — Walter D. Griffin
*Assistant Examiner* — Cameron J Allen
(74) *Attorney, Agent, or Firm* — Jon E. Holland; Butler Snow LLP

(57) ABSTRACT

The present disclosure is directed to method of treating water/wastewater using a plasmon-enhanced catalytic ozonation process. Water/wastewater often contains numerous pollutants, some of which are particularly difficult and inefficient to remove and require energy-intensive treatment such as advanced oxidation processes. The present plasmonic metal nanostructured catalyst is configured to interact with electromagnetic radiation through excitation of localized surface plasmon resonance, leading to accelerated ozone decomposition and reactive species generation. The reactive species oxidizes water pollutants, resulting in a water treatment process that avoids excessive energy input and creation of toxic byproducts. In an exemplary application of the plasmon-enhanced catalytic ozonation process, the atrazine degradation rate is increased compared to conventional ozonation and catalytic ozonation processes, owing to the plasmonic effects of Ag in the plasmonic metal nanostructured catalyst.

22 Claims, 26 Drawing Sheets

(51) Int. Cl.
    *C02F 1/30*      (2023.01)
    *C02F 1/72*      (2023.01)
    *C02F 101/36*    (2006.01)
    *C02F 101/38*    (2006.01)

(56) References Cited

PUBLICATIONS

Amaro, et al., "Ensemble Docking in Drug Discovery," Biophysical Journal, 2018, pp. 2271-2278, vol. 114.
Elrahman, et al., "A Review of Class Imbalance Problem," Journal of Network and Innovative Computing, 2013, pp. 332-340, vol. 1.
Johnson, et al., "Pattern recognition of jet fuels: comprehensive GC×GC with ANOVA-based feature selection and principal component analysis," Chemometrics and Intelligent Laboratory Systems, 2002, pp. 225-237, vol. 60.
Macedo, et al., "Theoretical Foundations of Forward Feature Selection Methods based on Mutual Information," Neurocomputing, 2018, pp. 1-41.
Guyon, et al., "An Introduction to Variable and Feature Selection," Journal of Machine Learning Research, 2003, pp. 1157-1182, vol. 3.
Eckmann, et al., "Recurrence Plots of Dynamical Systems," Europhysics Letters, 1987, pp. 973-977, vol. 4, No. 9.
Peng, et al., "An Introduction to Logistic Regression Analysis and Reporting," The Journal of Educational Research, 2002, pp. 1-13, vol. 96, No. 1.
Hernandez, et al., "An Empirical Study of Oversampling and Undersampling for Instance Selection Methods on Imbalance Datasets," Iberoamerican Congress on Pattern Recognition, 2013, pp. 262-269.
Shelke, et al., "A review on imbalanced data handling using undersampling and oversampling techniques," International Journal of Recent Trends in Engineering and Research, 2017, pp. 444-449, vol. 3, No. 4.
Liu, et al., "A Combining integrated sampling with SVM ensembles for learning from imbalanced datasets," Information Processing and Management, 2011, pp. 617-631, vol. 47. No. 4.
Chawla, et al., "SMOTE: synthetic minority over-sampling technique," Journal of Artificial Intelligence Research, 2002, pp. 321-357, vol. 16.
Chen, et al., "A non-parametric mixture of Gaussian naive Bayes classifiers based on local independent features," Artificial Intelligence and Signal Processing Conference, 2017, pp. 209-212.
Chemical Computing Group, "Molecular Operating Environment" https://www.chemcomp.com/Products.html, 2019.
Akondi, et al., Novel Big Data-Driven Machine Learning Models for Drug Discovery Application, 2022, pp. 1-22, vol. 27.

\* cited by examiner

FIG. 14A  FIG. 14B

PLASMON-ENHANCED CATALYTIC OZONATION FOR RECALCITRANT WATER POLLUTANT REMOVAL

STATEMENT REGARDING FEDERALLY SPONSORED RESEARCH OR DEVELOPMENT

This invention was made with Government support under CBET-1606117, awarded by the National Science Foundation. The Government has certain rights in the invention.

TECHNICAL FIELD

The present disclosure is directed to methods of treating water/wastewater using plasmon-enhanced catalytic ozonation. More specifically, plasmon-enhanced catalytic ozonation is utilized to remove recalcitrant water pollutants as a method of treating water/wastewater.

RELATED ART

Conventional water treatment aims to remove pollutants, such as inorganic solutes (e.g. heavy metals, nitrates) and bulk organics from water and wastewater. In particular, recalcitrant organic pollutants have proven difficult to remove efficiently due to the energy-intensive treatment methods involved in their removal. For instance, advanced oxidation processes (AOPs) are capable of permanently destroying recalcitrant pollutants through in situ generation of highly reactive species, though these processes may have high energy requirements and may create unwanted toxic byproducts.

UV-based processes utilize UV with $H_2O_2$ or $O_3$, but have low energy efficiency. Ozone-based AOPs, which utilize ozone ($O_3$) and other agents (e.g., $H_2O_2$) that promote $O_3$ decomposition and propagate formation of hydroxyl radicals, serve as an unselective and indirect reaction pathway. However, $H_2O_2$ use, transport, storage, and excess dose destruction is expensive, making associated processes less cost effective. Improved catalysts for ozone decomposition are needed to improve water treatment efficiency and reduce the formation of unwanted byproducts.

SUMMARY OF THE DISCLOSURE

The present disclosure is directed to methods of treating water/wastewater using plasmon-enhanced catalytic ozonation. In one aspect of the disclosure, there is provided a method of water treatment. The method includes the steps of providing a plasmonic metal nanostructure catalyst, the plasmonic metal nanostructure catalyst including a substrate, the substrate doped with a nanostructured plasmonic metal. The plasmonic metal nanostructure catalyst is combined with ozone and water in a reactor vessel that is exposed to electromagnetic radiation, where the water containing at least one water pollutant. The plasmonic metal nanostructure catalyst interacts with the electromagnetic radiation through excitation of localized surface plasmon resonance so that reactive species are generated from ozone decomposition. The reactive species oxidize the at least one water pollutant and treat the water.

In some embodiments, the plasmonic metal nanostructure catalyst is silver-doped manganese iron oxide (Ag/$MnFe_2O_4$). In some cases, the Ag/$MnFe_2O_4$ has 0.25-1 wt% silver (Ag) relative to manganese (Mn). In some cases, the Ag/$MnFe_2O_4$ has 0.5 wt% Ag relative to Mn. In some instances, the substrate is a spinel ferrite, such as a manganese iron oxide ($MnFe_2O_4$). In some instances, the metal is Ag. In some embodiments, the electromagnetic radiation is provided to the reactor vessel from at least one light-emitting diode (LED). The at least one LED is a monochromatic blue LED with a wavelength of 470 nm in some cases. In other embodiments, the electromagnetic radiation is provided to the reactor vessel at other wavelengths (e.g. 385~655 nm). In some instances, the reactive species are at least one of ·OH, $O_2·^-$, and $^1O_2$. In some embodiments, the method further includes the step of determining an amount of the at least one water pollutant in at least one sample of the water during treatment. In some embodiments, the method further includes the step of determining an amount of the at least one water pollutant in the water after treatment. In some embodiments, the method further includes the step of removing residual ozone from the water with a quenching agent after treatment.

In another aspect of the disclosure, there is provided a method of oxidizing water pollutants. The method includes providing a plasmonic metal nanostructure catalyst, the plasmonic metal nanostructure catalyst including a substrate, nanostructures, the substrate doped with a nanostructured plasmonic metal. The plasmonic metal nanostructure catalyst is combined with ozone and water in a reactor vessel that is exposed to at least one LED providing 470 nm electromagnetic radiation. The water contains at least one water pollutant. The plasmonic metal nanostructure catalyst interacts with the electromagnetic radiation through excitation of localized surface plasmon resonance so that reactive species are generated from ozone decomposition. The reactive species oxidize the at least one water pollutant and treat the water.

In some embodiments, the plasmonic metal nanostructure catalyst is 0.5 wt% Ag/$MnFe_2O_4$. In some embodiments, the reactive species are at least one of ·OH, $O_2·^-$, and $^1O_2$. In some embodiments, the method further includes the step of determining an amount of the at least one water pollutant in at least one sample of the water during treatment. In some embodiments, the method further includes the step of determining an amount of the at least one water pollutant in the water after treatment. In some embodiments, the method further includes the step of removing residual ozone from the water with a quenching agent after treatment. In some cases, the quenching agent is sodium thiosulfate ($Na_2S_2O_3$). A further understanding of the nature and advantages of the present invention will be realized by reference to the remaining portions of the specification and the drawings.

BRIEF DESCRIPTION OF DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 14A is a graphical representation of the effects of pH on ATZ removal during plasmon-enhanced catalytic ozonation. LED wavelength: 470 nm±10 nm; photon flux: $4.28 \times 10^{-10}$ Einstein L$^{-1}$·s$^{-1}$. A pH$_0$ of 5 is represented by ■, pH$_0$ of 6 is represented by ●, pH$_0$ of 7 is represented by ▲, and pH$_0$ of 9 is represented by ▼.

FIG. 14B is a graphical representation of the effects of O$_3$ dose on ATZ removal during plasmon-enhanced catalytic ozonation. LED wavelength: 470 nm±10 nm; photon flux: $4.28 \times 10^{-10}$ Einstein L$^{-1}$·s$^{-1}$. An O$_3$/TOC of 1 (mass ratio) is represented by ■, O$_3$/TOC of 2 is represented by ●, O$_3$/TOC of 3 is represented by ▲, and O$_3$/TOC of 4 is represented by ▼.

FIG. 15 is a graphical representation of ATZ degradation with MnFe$_2$O$_4$ as the catalyst. Initial ATZ concentration: 2 mg/L; initial O$_3$ concentration: 2.7 mg/L; working solution: 150 mL; catalyst dose: 1.2 g/L; LED wavelength: 470 nm±10 nm; photon flux (when irradiated): $6.4 \times 10^{-10}$ Einstein L$^{-1}$·s$^{-1}$; pH$_0$=7. O$_3$ is represented by ■, MnFe$_2$O$_4$ with light irradiation at 470 nm is represented by ●, O$_3$ with light irradiation at 470 nm is represented by ▲, O$_3$ with MnFe$_2$O$_4$ is represented by ▼, and O$_3$ with MnFe$_2$O$_4$ and light irradiation at 470 nm is represented by.

DETAILED DESCRIPTION

The present disclosure is generally directed to methods for treating water or wastewater using a plasmon-enhanced catalytic ozonation process. A silver (Ag)-doped manganese iron oxide (MnFe$_2$O$_4$) catalyst (Ag/MnFe$_2$O$_4$) is synthesized using a sol-gel method followed by H$_2$ reduction. Utilizing the localized surface plasmon resonance (LSPR) of the plasmonic metal nanostructured catalyst, the degradation rate is increased for recalcitrant pollutants, represented by an ozone-resistant water pollutant (atrazine, ATZ). This process achieves increased pollutant degradation with a low photon flux (approximately $10^{-10}$ Einstein $L^{-1}$), relative to conventional ozonation and catalytic ozonation, and also outperforms the homogeneous peroxone (O$_3$/H$_2$O$_2$) process. The plasmon-mediated enhancement is realized through energy transferred from plasmonic Ag nanostructures to ozone adsorptive sites during the LSPR decay, leading to an accelerated ozone decomposition and subsequent radical generation (e.g., OH, $O_2 \cdot^-$, and $^1O_2$) at both existing and newly activated catalytic active sites. Ag LSPR also helps maintain Ag$^0$ in an oxidizing aqueous environment, which is important to sustain high catalytic activity. Because of these plasmonic effects, more than 90% removal is achieved in tap water under realistic water treatment conditions.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., "at least one" of what is described), unless the context clearly indicates otherwise. In every case, use of singular articles and pronouns should be interpreted to support claims to at least one of what is described, and to support claims to exactly one of what is described.

Terms such as "at least one of A and B" should be understood to mean "only A, only B, or both A and B." The same construction should be applied to longer list (e.g., "at least one of A, B, and C").

Figure 1:
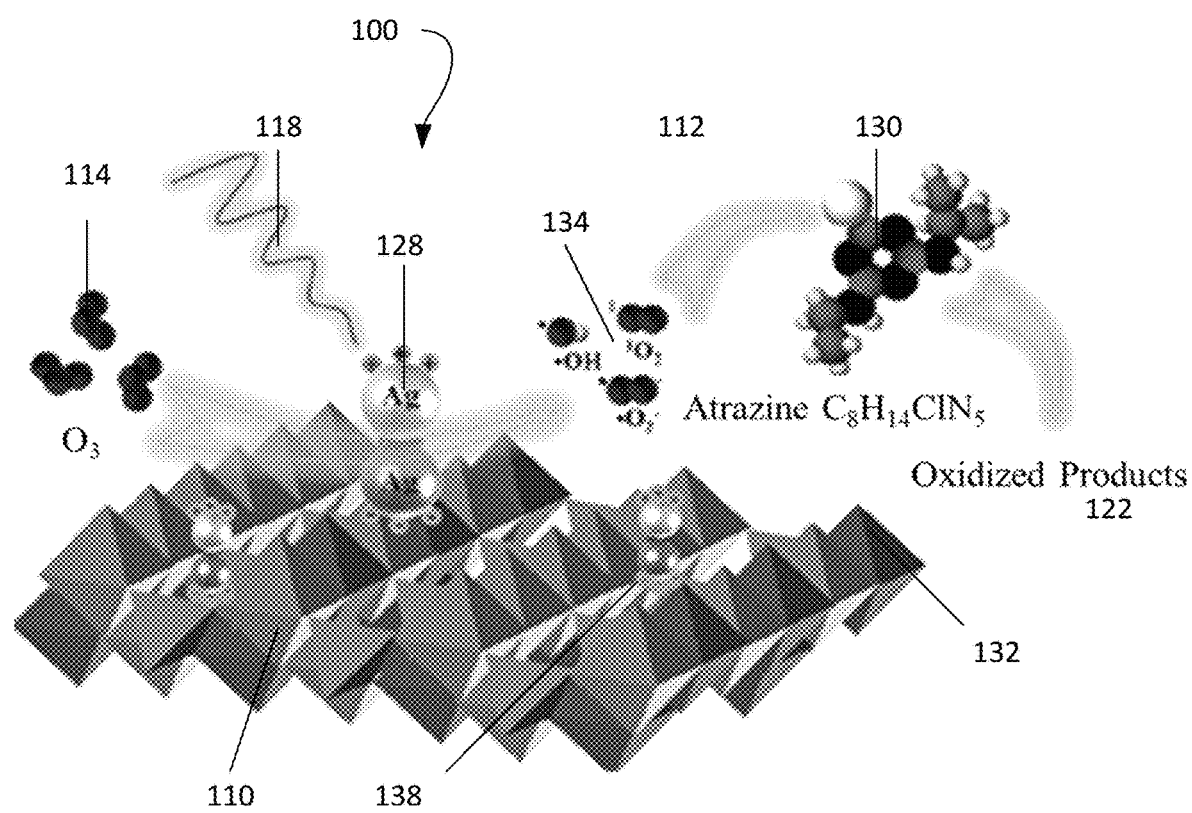
FIG. 1 is a schematic representation of a plasmon-enhanced catalytic oxidation process in accordance with the present disclosure for the removal of recalcitrant water pollutants.

A plasmon-enhanced catalytic ozonation process 100 of the present disclosure is illustrated for treatment of an exemplary water pollutant 130 in FIG. 1. Process 100 includes the use of a plasmonic metal nanostructured catalyst (PMN catalyst) 110, along with ozone 114 and electromagnetic radiation 118, to treat water 112 containing one or more water pollutants 130. The process for producing PMN catalyst 110 is described in greater detail below.

Water 112 is any water for treatment and capable of transmitting electromagnetic radiation 118, and includes wastewater, tap water, and water from both natural and man-made bodies of water, such as lakes, reservoirs, and springs. Water is, in some instance pre-treated or post-treated according to treatment processes known in the art. In other instances, process 100 is the only treatment process utilized in the treatment of water 112. One or more contaminants or water pollutants 130 are present in water 112, where at least one of the one or more water pollutants 130 is desired to be degraded, removed, or otherwise made compatible with human use or consumption. Exemplary water pollutants 130 include, but are not limited to, viruses, inorganic solutes, heavy metals, metal ions, complex organic compounds, natural organic matter, disinfectants, detergent metabolites, and plant and animal steroids, and nitrates. In some instances, water pollutant 130 is a recalcitrant pollutant which is difficult or otherwise inefficient to remove using conventional water treatment techniques. Exemplary recalcitrant water pollutants include prescription and non-prescription drugs and their metabolites, fragrance compounds, flame retardants and plasticizers, cosmetic compounds, and recalcitrant organic products. The reduction of such water pollutants 130 is in some instances undertaken to reach acceptable amounts or concentrations of water pollutants 130, including removal or conversion of all or substantially all of one or more water pollutants 130. Exemplary regulations regarding acceptable pollutant levels include those disclosed by the U.S. Environmental Protection Agency's National Primary Drinking Water Regulations and the Safe Drinking Water Act.

In FIG. 1, atrazine (ATZ) is depicted as an exemplary water pollutant 130. ATZ is a widely used herbicide, serves as a model ozone-resistant pollutant ($k_{O3}$, pH=7=6 $M^{-1} \cdot s^{-1}$, $k_{\cdot OH}$=3.0×10$^9$ $M^{-1} \cdot s^{-1}$). Thus, ATZ is a recalcitrant pollutant. Water for treatment containing ATZ requires its decomposition into oxidized products 122. This is undertaken by generation of reactive species 134, such as ·OH, $O_2 \cdot ^-$, and $^1O_2$.

Metal/metal oxides are the conventional catalysts used to promote ozone 114 decomposition in both gaseous and aqueous phases for the generation of reactive species 134. The overall decomposition generally includes a dissociative adsorption of $O_3$ 114 and subsequent decomposition of intermediate products or reactions of the intermediate products with $O_3$ 114, during which reactive oxygen species 134 are generated. An effective catalyst for ozone 114 decomposition should not only have a good reactivity with ozone 114 (e.g., adsorption and decomposition ability) but also have "appropriately strong" bonds with the oxygen species formed during ozone decomposition. When oxygen species on a catalyst surface are very stable, the desorption of these species becomes the rate-limiting step and impedes the overall ozone 114 decomposition. Moreover, for aqueous ozonation reactions, the stability of the catalysts in the strong oxidizing environment can also be a concern, which may lead to catalyst deactivation as well as a degradation of the treated water quality.

Plasmonic metal nanostructures (PMN) (e.g., Au, Ag, and Cu) can interact strongly with electromagnetic radiation 118 such as photons through an excitation of localized surface plasmon resonance (LSPR) when the frequency of photons matches the natural oscillation frequency of the surface electrons. LSPR can build up intense oscillating electric fields in the proximity of the nanostructure that are several orders of magnitude higher than that of the incoming photon flux, through which PMN channel the energy of photons of Sun-like intensities to drive chemical transformations. The present disclosure uses Ag/Ag oxides as a plasmonic metal (PM) 128 for producing PMN catalyst 110, as a lower photon energy input can result in a noticeable enhancement of the reaction rate, since ozone decomposition is a thermodynamically favorable process ($\Delta G^{o}_{298}$=−163 KJ/mol, $\Delta H^{o}_{298}$=−138 KJ/mol) with low activation energy.

PMN catalyst 110 is prepared using PM 128, which is a metal, such as Au, Ag, or Cu, that is configured to be nanostructured into a plasmonic nanostructure 132 and interact strongly with electromagnetic radiation 118 such as photons through an excitation of LSPR. PM 128 is, in some embodiments Ag, and prepared using silver nitrate (Ag($NO_3$)). For nanostructures of PMN catalyst 110, a substrate is utilized. In some instances, the substrate is spinel ferrite 138 because the stable mineralogical structure is capable of preventing metallic ion leaching, and also because the enriched surface hydroxyl groups is capable of providing active sites for catalytic ozone decomposition. In some embodiments, spinel ferrite 138 is a manganese iron oxide ($MnFe_2O_4$) spinel ferrite 138 configured to be doped with PM 128 to form PMN catalyst 110.

Briefly, $MnFe_2O_4$ spinel ferrite 138 is produced by first providing iron nitrate (Fe($NO_3$)$_3 \cdot 9H_2O$) and manganese nitrate Mn($NO_3$)$_2$ in a solution of deionized water (DI water). This is followed by a dropwise addition of citric acid at room temperature (approximately 20-22° C. or 68-72° F.). A molar ratio of Mn(II):Fe(III):citric acid=1:2:3 is utilized, though other ratios are possible. The precursor solution is adjusted to a pH of 5 using ammonium hydroxide or another compatible basic solution. This pH is utilized to stabilize the nitrate-citrate sol, though other similar pH levels are compatible such that the nitrate-citrate sol is stabilized. The precursor solution is continuously stirred at approximately 60° C. for 2 h and then evaporated in a water bath at approximately 80° C. to form brown sticky gel. However, other stirring and heating times and temperatures are compatible with the present disclosure such that a gel is formed. The gel is transferred into an oven or other heating source and dried at approximately 70° C. or another temperature compatible with drying the gel. The dry gel is heated in an oven or other heat source at approximately 250° C. for 30 min and cooled down to room temperature. The mixture is ground into powder using a pestle and mortar, or other grinding or pulverizing means. The powder is calcined in a furnace at approximately 300° C. for 4 h in air with a heating rate of approximately 5° C./min and $MnFe_2O_4$_air is obtained. To prepare $MnFe_2O_4$, $MnFe_2O_4$ air is further reduced under $H_2$ at approximately 250° C. for 30 min.

For the production of Ag-doped $MnFe_2O_4$, PMN catalyst 110, a similar procedure to that used in the production $MnFe_2O_4$ is undertaken, with the exception of adding silver nitrate ($Ag(NO_3)$) into the precursor solution along with manganese and ferric salts. $Ag(NO_3)$ is added at 0.25-1 wt % Ag relative to Mn, though other wt % are possible.

Figure 2:
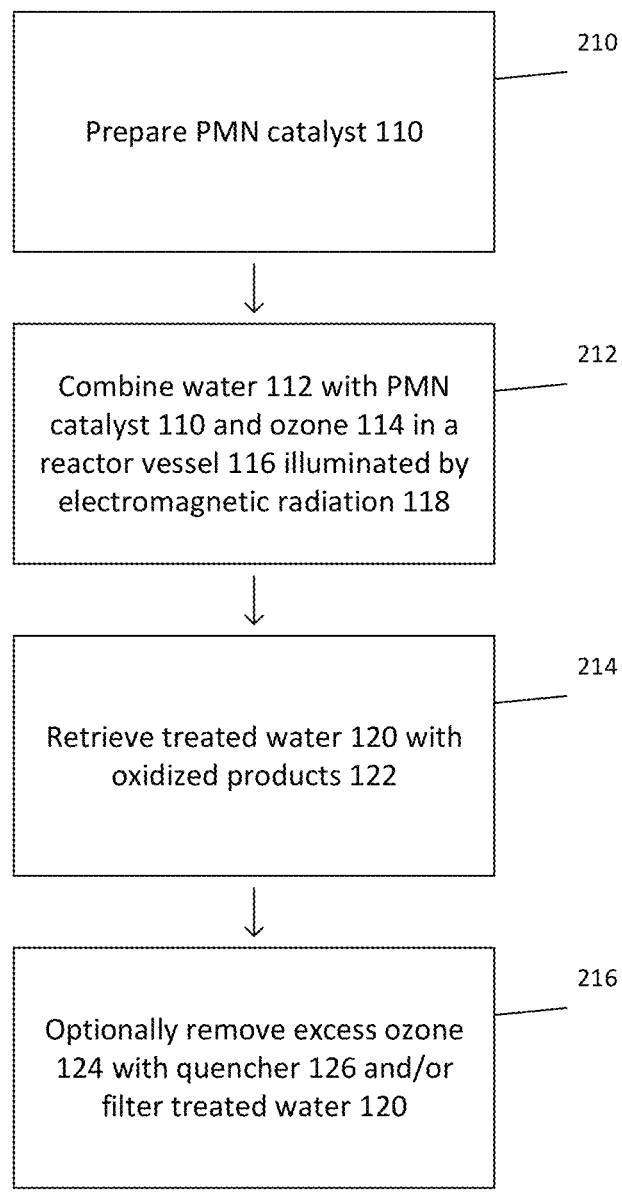
FIG. 2 is a flowchart depicting a plasmon-enhanced catalytic ozonation process in accordance with the present disclosure.
Figure 3A:
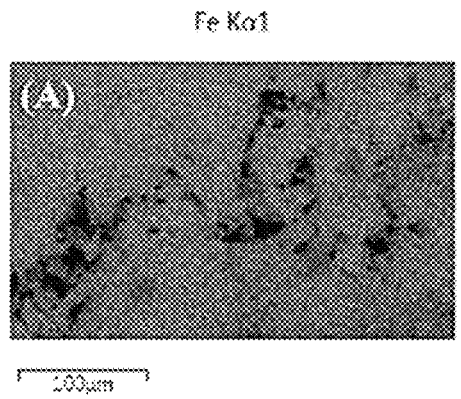
FIG. 3A is an image depicting an energy-dispersive X-ray spectroscopy (EDS) mapping of iron (Fe) with a K series line type. Scale bar represents 100 μm.
Figure 3B:
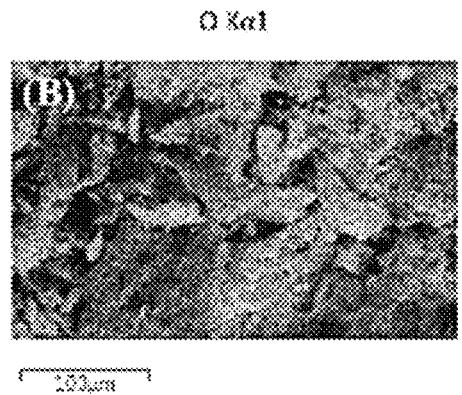
FIG. 3B is an image depicting an EDS mapping of oxygen (O) with a K series line type. Scale bar represents 100 μm.
Figure 3C:
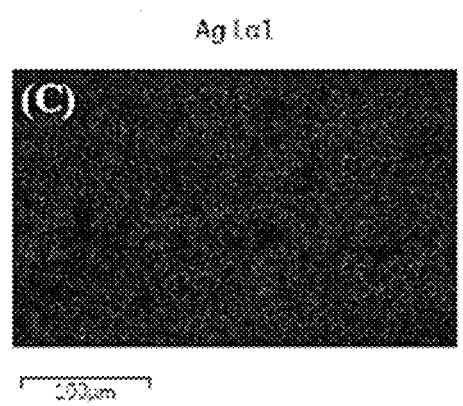
FIG. 3C is an image depicting an EDS mapping of silver (Ag) with an L series line type. Scale bar represents 100 μm.
Figure 3D:
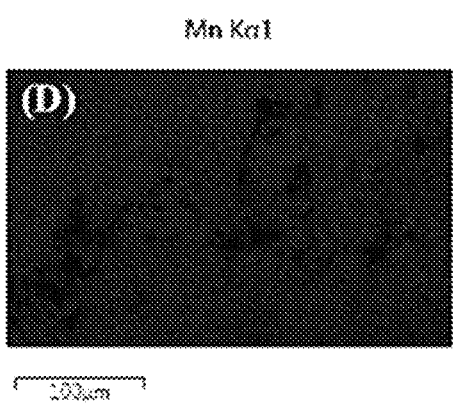
FIG. 3D is an image depicting an EDS mapping of manganese (Mn) with a K series line type. Scale bar represents 100 μm.
Figure 4:
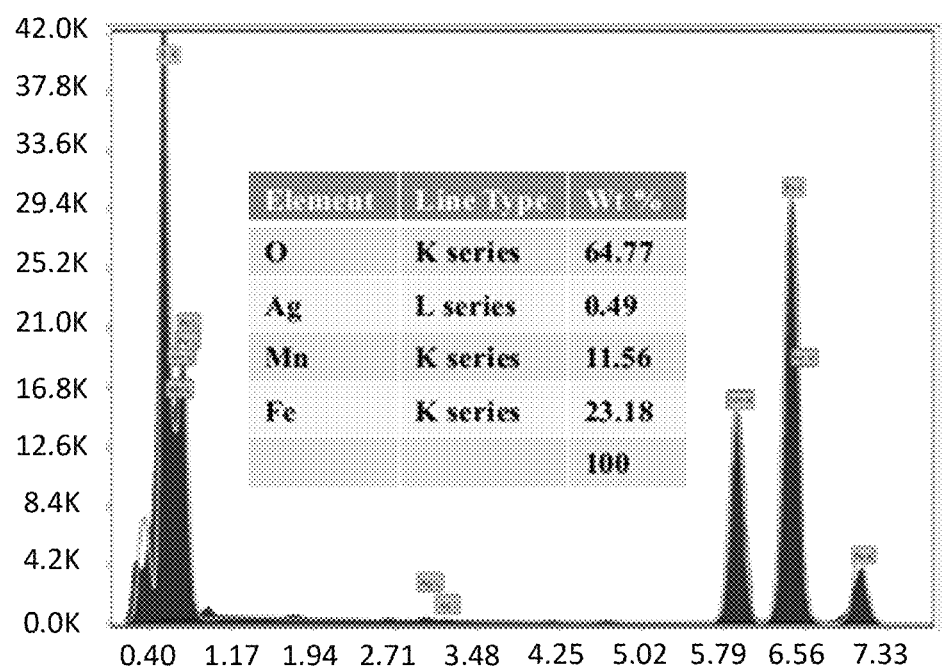
FIG. 4 is a graphical representation of the element distribution of 0.5 wt % Ag/MnFe$_2$O$_4$ from EDS. For O, the wt % is 64.77%, for Ag, the wt % is 0.49%, for Mn, the wt % is 11.56%, and for Fe, the wt % is 23.18%.

Referring now to FIG. 2, a method of treating water 112 using PMN catalyst 110 according to plasmon-enhanced catalytic ozonation process 100 is depicted. In step 210, PMN catalyst 110 is prepared, as described above and in detailed working example below. Water 112 is combined in a reactor vessel 116 with PMN catalyst 110 and ozone 114 and exposed to electromagnetic radiation 118 in step 212.

Figure 5:
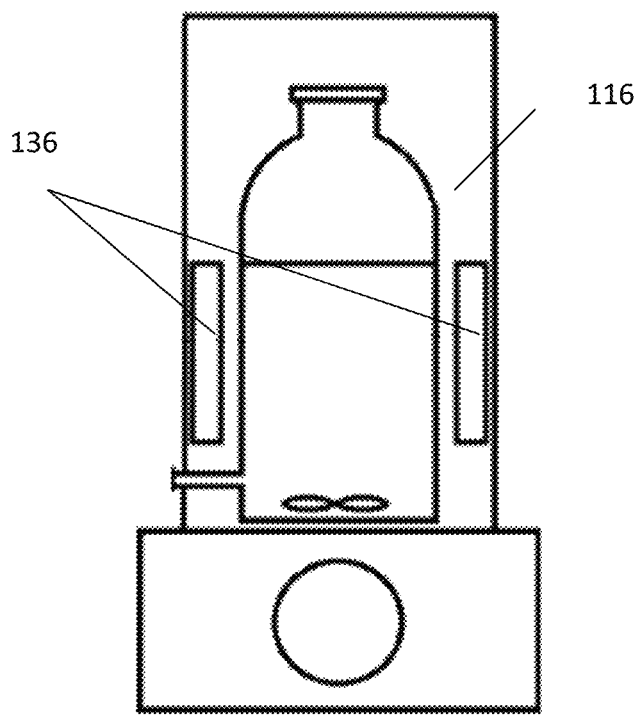
FIG. 5 is a schematic representation of a batch reactor for catalytic ozonation experiments.

An exemplary reactor vessel 116 is depicted in FIG. 5, where electromagnetic radiation 118 is provided by two electromagnetic radiation sources 136. In some embodiments, each electromagnetic radiation source 136 comprises one or more light emitting diodes (LEDs) or other lighting devices, such as incandescent bulbs. However, in other instances, electromagnetic radiation 118 is provided from other sources, such as from the cosmos (e.g., the sun and stars), radioactive elements, and other manufactured devices. Exemplary electromagnetic radiation 118 includes radio waves and microwaves, as well as infrared, ultraviolet, gamma, and x-rays, with wavelengths ranging from approximately $10^{-18}$ m to 100 km, and corresponding frequencies decreasing from $3 \times 10^{26}$ Hz to $3 \times 10^3$ Hz. In instances where electromagnetic radiation 118 is provided by sunlight, reactor vessel 116 provides access to sunlight. In preferred embodiments, monochromatic blue light-emitting diode (LED, 470±10 nm) is employed as a low-energy electromagnetic radiation source 136. However, other wavelengths of electromagnetic radiation 118 and other electromagnetic radiation sources 136 are compatible with the present disclosure, as long as the irradiation wavelength at the plasmonic band of the nanostructured catalysts is present. One or more electromagnetic radiation sources 136 are utilized, with two LEDs used in the depicted embodiment.

Reactor vessel 116 is in some instances kept at ambient temperature and pressure, while in other instances temperatures and pressures are varied. Reactor vessel 116 includes a quartz reactor in some instances, and includes an agitation means, such as a stirring plate.

Referring back to FIG. 2, step 212, water 112, PMN catalyst 110, and ozone 114 are combined and stirred continuously. Ozone 114 is generated by an ozone generator (e.g., MP5000, A2Z Ozone Inc.) with pure oxygen as the feeding gas. However, other ozone generation methods known in the art are compatible with the present disclosure. pH is optionally adjusted to a desired value, using, for example, sodium hydroxide or another compatible basic solution. The duration of mixing and reaction varies based on water 112 and water pollutants 130, and samples are taken during the reaction to assess reaction progress, water pollutant concentrations, and oxidized product concentrations.

In step 214, aliquots of treated water 120 is removed from reactor vessel 116 for analysis and use. Treated water 120, in some instances, has no detectable water pollutants 130, or water pollutants 130 at levels deemed acceptable by regulatory agencies or policies. In instances where treated water 120 contains unacceptable levels of water pollutants 130, further reaction according to step 212 is performed.

In step 216, excess ozone 124 is optionally removed from treated water 120. This removal is in some instances undertaken using a quencher 126, such as $Na_2S_2O_3$, or other ozone quenching materials. Treated water 120 is optionally filtered, such as through a 0.45 μm filter, to remove fine particles (e.g. catalyst).

Example

Materials and Methods

All chemicals were of analytical grade and were used as received without further purification. Iron nitrate nonahydrate ($Fe(NO_3)_3 \cdot 9H_2O$, commercially available from Acros Organics), silver nitrate ($AgNO_3$, commercially available from Alfa Aesar), and manganese nitrate ($Mn(NO_3)_2$, commercially available from Acros Organics) were the sources of catalyst preparation. Citric acid (commercially available from Fisher Chemical) was used as fuel and ammonium hydroxide (28%-35% w/w, commercially available from Fisher Scientific) was used to adjust pH on the process of catalyst preparation. Atrazine (commercially available from Sigma) was selected as the model compound. t-Butanol (TBA) (commercially available from Fisher Scientific), ethylenediamine tetra-acetic acid disodium salt dehydrate (EDTA-2Na, commercially available from Fisher Chemical), 1,4-benzoquinone (BQ) (commercially available from Alfa Aesar) and $NaN_3$ (commercially available from Acros Organics) were employed as the ·OH, h$^+$, ·$O_2^-$ and $^1O_2$ radical scavengers, respectively. Toluidine Blue. O. (commercially available from Acros Organics) was used to determine the density of surface hydroxyl group. Methyl viologen hydrate (98%, commercially available from Fisher Scientific) was used to trap electrons. Sodium hydroxide (NaOH, commercially available from Fisher Scientific) was used to adjust the pH of the working solutions. Deionized water (DI water, 18.2 Ωcm) was used for all synthesis and treatment processes unless otherwise noted.

Spinel ferrites ($MnFe_2O_4$) were synthesized using a one-pot sol-gel autocombustion method. Briefly, the precursor was obtained in an aqueous solution with a molar ratio of Mn(II):Fe(III):citric acid=1:2:3. Typically, 2.87 g of $Mn(NO_3)_2 \cdot 6H_2O$ and 8.08 g of $Fe(NO_3)^3 \cdot 9H_2O$ (molar ratio Mn:Fe=1:2) were first dissolved in 50 mL de-ionized (DI) water, followed by dropwise addition of 100 mL solution containing 6.304 g of citric acid at room temperature under vigorous agitation; then ammonium hydroxide was slowly added to adjust the solution pH to 5 and to stabilize the nitrate-citrate sol. The mixture was continuously stirred at 60° C. for 2 h and then evaporated in a water bath at 80° C. to form brown sticky gel. Subsequently, the sticky gel was transferred into an oven and dried at 70° C. The dry gel was then heated in an oven at 250° C. for 30 min and naturally cooled down to room temperature. The mixture was ground into powder using a pestle and mortar. Lastly, the powder was calcined in a furnace at 300° C. for 4 h in air with a heating rate of 5° C./min and $MnFe_2O_4$ air was obtained. To prepare $MnFe_2O_4$, $MnFe_2O_4$ air was further reduced under $H_2$ at 250° C. for 30 min.

Ag-doped $MnFe_2O_4$ was prepared following the same procedure except that a certain amount of $Ag(NO_3)$ (0.25-1 wt % Ag relative to Mn) was added into the precursor solution along with manganese and ferric salts. The actual content of Ag in the catalyst 0.5% Ag/MnFe$_2$O$_4$ was determined by energy-dispersive X-ray spectroscopy (EDS) (approximately 0.49 wt %), as shown in FIG. 3A, FIG. 3B, FIG. 3C, FIG. 3D, and FIG. 4, and by acid treatment of the catalyst followed by quantification of the dissolved Ag (approximately 0.45 wt %). Table 1 shows the pH$_{pzc}$, surface area, pore volume, and pore size of different catalysts.

TABLE 1

Point of Zero Charge (pHpzc) and Brunauer-Emmett-Teller (BET) Surface Analysis

| Catalyst | pH$_{pze}$ | BET Analysis Multipoint Surface Area (m$^2$/g) | Pore Volume (cc/g) | Pore Size (Å) |
|---|---|---|---|---|
| 0.5 wt % Ag/MnFe$_2$O$_4$ | 6.98 | 43.29 | 0.2166 | 17.1 |
| 0.5 wt % Ag/MnFe$_2$O$_4$_air | 6.98 | 42.36 | 0.1659 | 15.3 |
| MnFe$_2$O$_4$_air | 6.95 | 47.91 | 0.1751 | 15.3 |

X-ray diffraction (XRD) patterns were collected on a Rigaku MiniFlex 600. Transmission electron microscopy (TEM), high-resolution transmission electron microscopy (HR-TEM), and selected-area electron diffraction (SAED) characterizations were conducted using Argonne chromatic aberration-corrected TEM (ACAT; FEI Titan 80-300 ST with an image aberration corrector) at an accelerating voltage of 200 kV. X-ray absorption spectroscopy (XAS) measurements including X-ray absorption near edge structure (XANES) and extended X-ray absorption fine structure (EXAFS) were conducted for Ag K (approximately 25 514 eV), Fe K (approximately 7112 eV), and Mn K (approximately 6539 eV) edges at beamline 20-BM at the Advanced Photon Source at Argonne National Laboratory using a double crystal Si(111) monochromator. The XAS spectra were recorded in the fluorescence mode for Ag K edge and in the transmission mode for Mn K and Fe K edges. The samples were pressed into pellets and protected with kapton tape. X-ray photoelectron spectroscopy (XPS) was examined using Thermo Scientific ESCALAB 250Xi. The specific surface area was measured with the Brunauer-Emmett-Teller (BET) method on a Quantachrome Autosorb IQ-MP/XR at 77K, shown in Table 1.

Catalytic ozonation experiments were conducted in a batch reactor illuminated externally by two LEDs (470±10 nm), as depicted in FIG. 5. The ozone solution was first prepared in a 1 L Erlenmeyer flask by continuously feeding ozone gas into the container, where ozone was generated by an ozone generator (MP5000, A2Z Ozone Inc.) with pure oxygen as the feeding gas. To start an experiment, catalysts, atrazine, and 150 mL of ozone solution were added into the reactor, and the mixture was continuously stirred at 500 rpm at room temperature (22±2° C.). Unless otherwise noted, experiments were conducted in unbuffered deionized (DI) water to eliminate the interfering effects of other inorganic ions. The initial pH was adjusted to a desired value using NaOH, and the pH evolution during the experiments was monitored. Samples were taken at predetermined time intervals, quenched by Na$_2$S$_2$O$_3$ to remove the residual ozone, and then filtered through a 0.45 μm filter for a further analysis. Addition of Na$_2$S$_2$O$_3$ and filtration had no effects on the atrazine (ATZ) quantification. All experiments were conducted at least in duplicate, and the error bars in the figures indicate standard deviations. Concentrations of ATZ were measured by high-performance liquid chromatography (HPLC, Agilent 1100 series) or HPLC/MS/MS (DionEX UltiMate 3000-LTQ Orbitrap XL). Electron paramagnetic resonance (EPR) spectra were collected on a Bruker Elexsys 1×10$^{-10}$ E580 series X-band Fourier transform (FT) EPR at room temperature. Detailed information regarding analytical analysis of atrazine and dissolved ozone (DO$_3$) and determination of the photon flux is provided herein below.

Concentrations of ATZ were measured by high performance liquid chromatography (HPLC/UV, Agilent 1100 series) with a reversed-phase luna C-18 analytic column (Aglient 1100) at λ=230 nm. The eluent consisted of DI water and methanol (40/60, v/v) isocratic mixture and the flow rate was 0.5 mL/min. The low concentration of ATZ was measured by HPLC/MS/MS (DionEX UltiMate 3000-LTQ Orbitrap XL) in positive electrospray ionization (ESI) mode. Elution was performed at a flow rate of 0.3 mL/min with DI and acetonitrile (50/50, v/v) in the isocratic mode. The ionization source parameters included: spray voltage 3.0 kV, capillary temperature 300° C., sheath gas flow rate 20 (arb), and aux gas flow rate 6 (arb). The concentration of dissolved ozone (DO$_3$) was determined with the indigo method (See, for example Bellamy, W.; Awad, J.; Wei, J. Ozone: Science & Engineering: The Journal of the 414 International Ozone Association In-Line Ozone Dissolution Demonstration-Scale 415 Evaluation. *Ozone Sci. Eng.* 1982, 4, 169-176. 416 https://doi.org/10.1080/01919512.2011.602006.).

Photon flux was determined using an actinometric procedure. The photon flux Ix (Einstein·s$^{-1}$) was determined by a graphical evaluation based on the following equation:

$$-\frac{\Delta A}{\Delta L} = -b = \frac{0.96\, Q\, \varepsilon\, d}{V} \times I_\lambda.$$

(See, for example, H. J. Adick, R. S. and H. D. B. Two Wavelength-Independent Chemical Actinometers 418 Which Together Cover the Rang 334-500 Nm. *Journal Photochem. Photobiol. A Chemistry* 419 1988, 45, 89-96.) The absorbance A was measured and plotted as a function of the irradiation time t. The slope of the resulting straight line was used to calculate I$_\lambda$ by employing the known properties V, Q, ε, and d, where V (dm$^3$) was the volume of the sample, Q was quantum yield, ε was the corresponding extinction coefficient, and d was the optical path length. Since these values were constants, the slope b was a function of the photon flux I$_\lambda$ of the irradiation beam. 16 μM of 2-Nitrobenzaldehyde (2-NB) with a reported quantum yield 0.41 (molecule photon-1) was used as the actinometer, and its decay versus irradiation time was monitored.

Catalyst Characterization

Figure 6A:
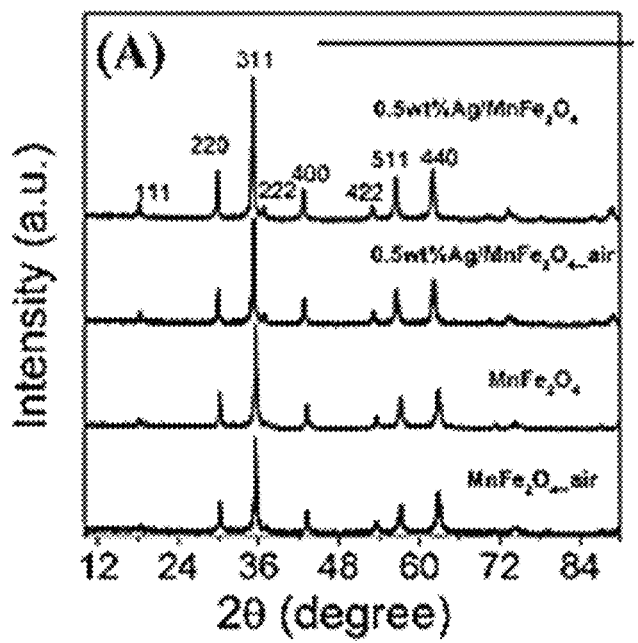
FIG. 6A is a graphical representation of XRD patterns of MnFe$_2$O$_4$ with and without Ag doping. A continuous model was used with a step size of 0.01 degree and a speed of 0.5 degree/min.

The crystalline phases of MnFe$_2$O$_4$ with and without Ag doping were explored by XRD patterns, shown in FIG. 6A, which agree well with the standard JCPDS (Card No. 10-0319) for the magnetic spinel MnFe$_2$O$_4$, suggesting that Ag doping did not change the spinel structure. While MnFe$_2$O$_4$ calcined in air (MnFe$_2$O$_4$_air) and MnFe$_2$O$_4$ calcined in H$_2$ (MnFe$_2$O$_4$) exhibited the same diffraction peaks, the Bragg's angle of the (311) peak of 0.5 wt % Ag/MnFe$_2$O$_4$_air slightly shifted toward lower 2θ values by 0.30° (FIG. 6B), indicating an increase in the lattice parameter values.

The lattice parameters (a) of (311) of different catalysts were calculated with the following equation: a=[(λ/2)×(h$^2$+k$^2$+l$^2$)$^{1/2}$]/(sin θ). In this equation, λ=1.5406 Å, h, k, and l are the miller indices of the crystal planes. Also, the (311)

peak was selected to calculate the crystallite size (DXRD) of the catalysts using Debye-Scherrer equation: DXRD=0.9π/β cos (θ). In this equation, DXRD is the crystallite size, A=1.5406 Å (Cu-kα radiation), β is the peak width at half height (convert into radians) of the (311) main intensity peaks. θ is the Bragg angle. Results of the lattice parameters (a) and $D_{XRD}$ are summarized in Table 2.

TABLE 2

Lattice Parameters of Different Catalysts

| Catalysts | Lattice Parameters a (Å) | $D_{XRD}$ (nm) |
|---|---|---|
| $MnFe_2O_4$ air | 8.36 | 46.39 |
| $MnFe_2O_4$ | 8.36 | 44.89 |
| 0.5 wt % $AgMnFe_2O_4$_air | 8.43 | 50.73 |
| 0.5 wt % $AgMnFe_2O_4$ | 8.46 | 69.45 |

Figure 6B:
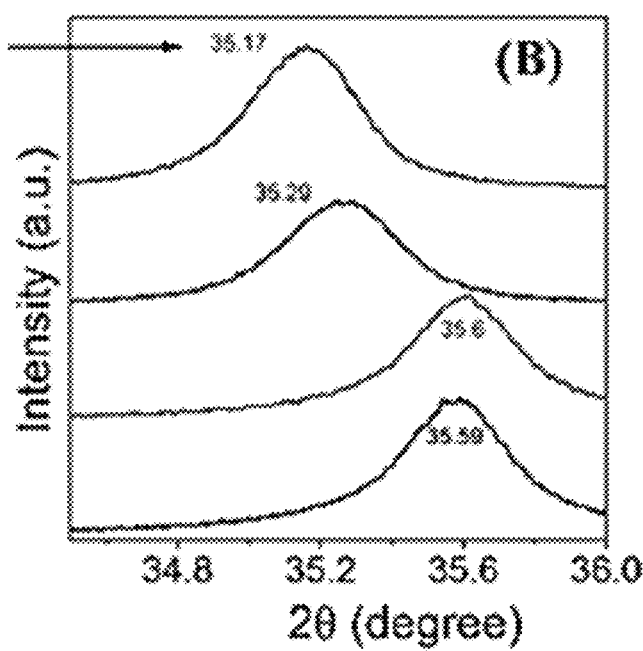
FIG. 6B is a graphical representation of XRD patterns of MnFe$_2$O$_4$ with and without Ag doping. Step scan mode was used with a step size of 0.01 degree and a count time of 5 s.
Figure 7A:
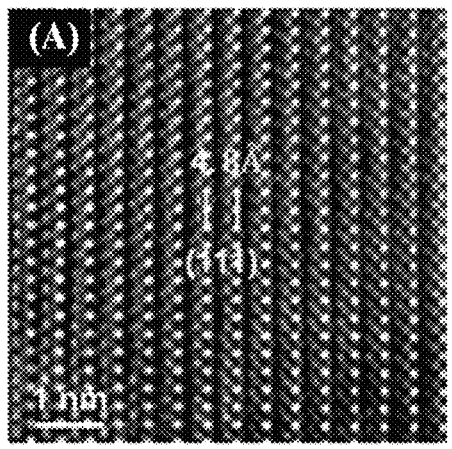
FIG. 7A is a representative high-resolution transmission electron microscopy (HRTEM) image depicting 0.5% Ag/MnFe$_2$O$_4$ with (111) lattice fringe. Scale bar represents 1 nm.
Figure 7B:
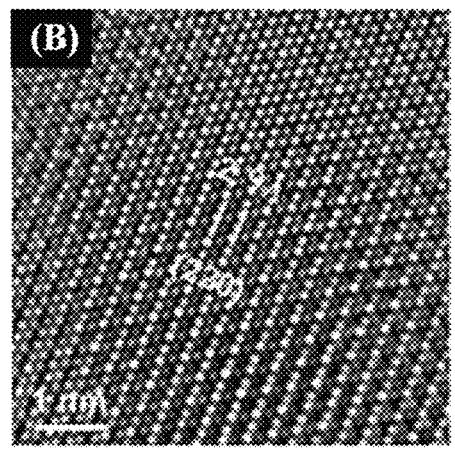
FIG. 7B is a representative HRTEM image depicting 0.5% Ag/MnFe$_2$O$_4$ with (220) lattice fringe. Scale bar represents 1 nm.
Figure 7C:
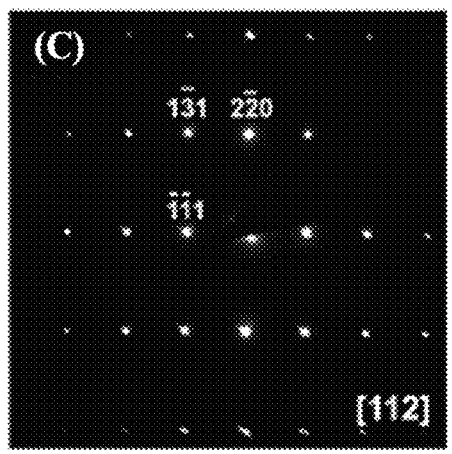
FIG. 7C is a representative HRTEM image depicting 0.5% Ag/MnFe$_2$O$_4$ with a selected-area electron diffraction (SAED) pattern along zone axes.
Figure 7D:
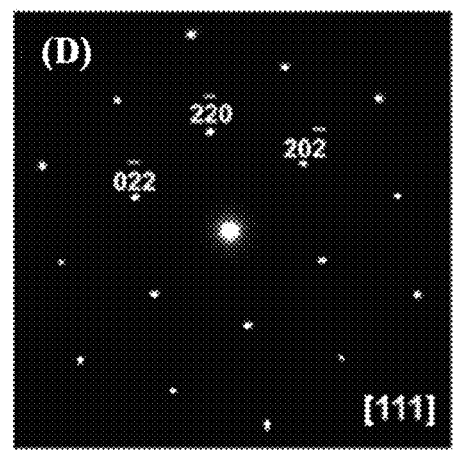
FIG. 7D is a representative HRTEM image depicting 0.5% Ag/MnFe$_2$O$_4$ with a SAED pattern along zone axes.

This shift potentially results from the substitution of $Mn^{2+}$ with a smaller ionic radius (0.7 Å) by $Ag^+$ with a larger ionic radius (1.15 Å). In other words, Ag ions have infiltrated into the lattice of $MnFe_2O_4$ and generated stress in the crystal lattice. When Ag-doped $MnFe_2O_4$ was calcined in $H_2$ (0.5 wt % Ag/$MnFe_2O_4$), the diffraction peak of (311) shifted toward a lower 2θ further (FIG. 6B). This can be ascribed to the generation of oxygen vacancies during the $H_2$ treatment (which is compensated for by the valence change of Ag ions ($Ag^+ \rightarrow Ag^0$) or is occupied by a hydrogen atom). Hence, the Ag exsolution might have occurred. High-resolution transmission electron microscopy (HRTEM) images of 0.5 wt % Ag/$MnFe_2O_4$ taken in the [100], [112], and [111] zone axes are shown in FIG. 7A, FIG. 7B, FIG. 7C, and FIG. 7D, as described above. The lattice fringes calculated from both HRTEM and SAED agree well with those obtained from XRD results, as shown in Table 3, which are also similar to that of $MnFe_2O_4$ except for a contraction of (220) and (311) planes. For standards, see: Hu, H.; Tian, Z.; Liang, J.; Yang, H.; Dai, A.; An, L.; Wu, H.; Yang, S. Surfactant-Controlled Morphology and Magnetic Property of Manganese Ferrite Nanocrystal Contrast Agent. Nanotechnology 2011, 22 (8), 85707; and Lu, J.; Ma, S.; Sun, J.; Xia, C.; Liu, C.; Wang, Z.; Zhao, X.; Gao, F.; Gong, Q; Song, B.; et al. Manganese Ferrite Nanoparticle Micellar Nanocomposites as MRI Contrast Agent for Liver Imaging. Biomaterials 2009, 30 (15), 2919-2928. This could be an indication of the crystal structure being altered by the addition of Ag.

TABLE 3

Comparison of Measured Lattice Spacing along Respective (hkl) Indexes of 0.5% Ag/$MnFe_2O_4$ and Standard $MnFe_2O_4$ Lattice Spacing

| | | Lattice Fringe (Å) | | | |
|---|---|---|---|---|---|
| (hkl) | 2θ | XRD | HRTEM | SAED | standard |
| (111) | 18.15 | 4.87 | 4.8 | 4.87 | 4.86 |
| (220) | 29.84 | 2.9 | 2.9 | 2.9 | 3.01 |
| (311) | 35.17 | 2.54 | | 2.54 | 2.56 |

Figure 8A:
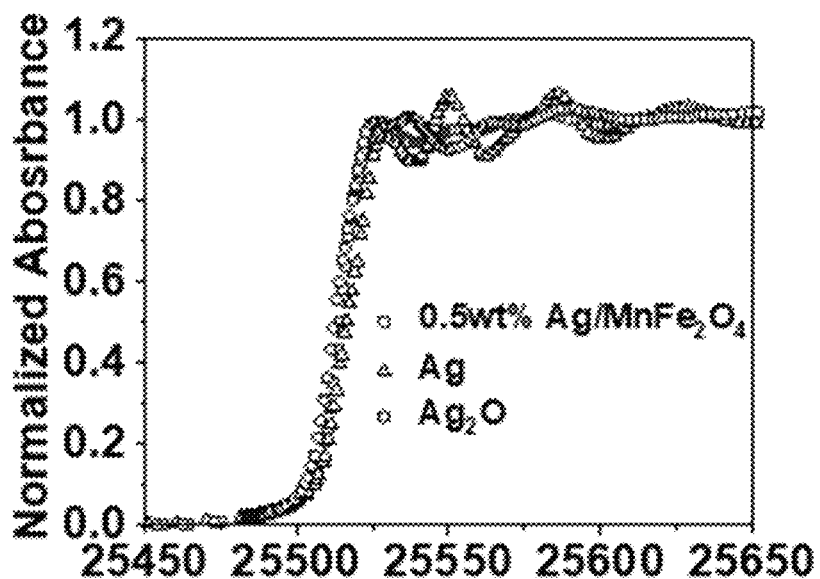
FIG. 8A is a graphical representation of X-ray absorption near edge structure (XANES) spectra of 0.5 wt % Ag/MnFe$_2$O$_4$ with reference spectra at Ag—K edges.
Figure 8B:
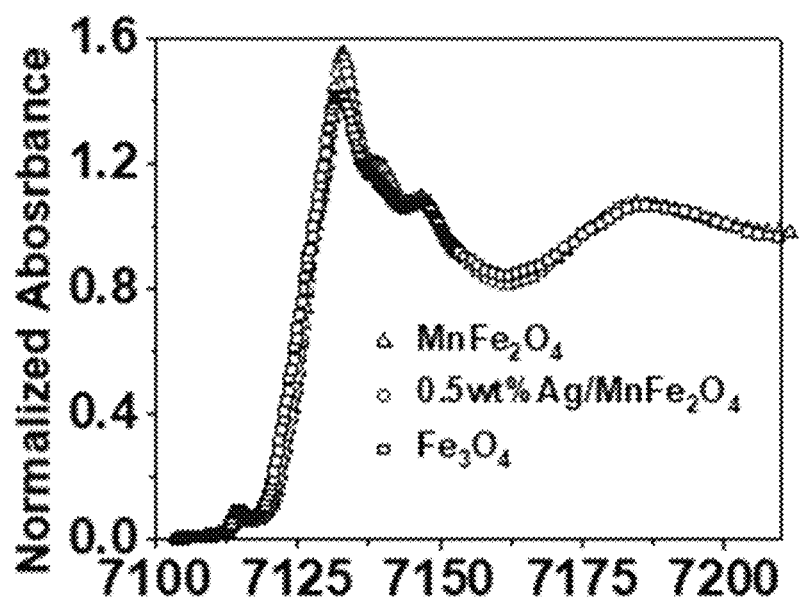
FIG. 8B is a graphical representation of XANES spectra of 0.5 wt % Ag/MnFe$_2$O$_4$ with reference spectra at Fe—K edges.
Figure 9A:
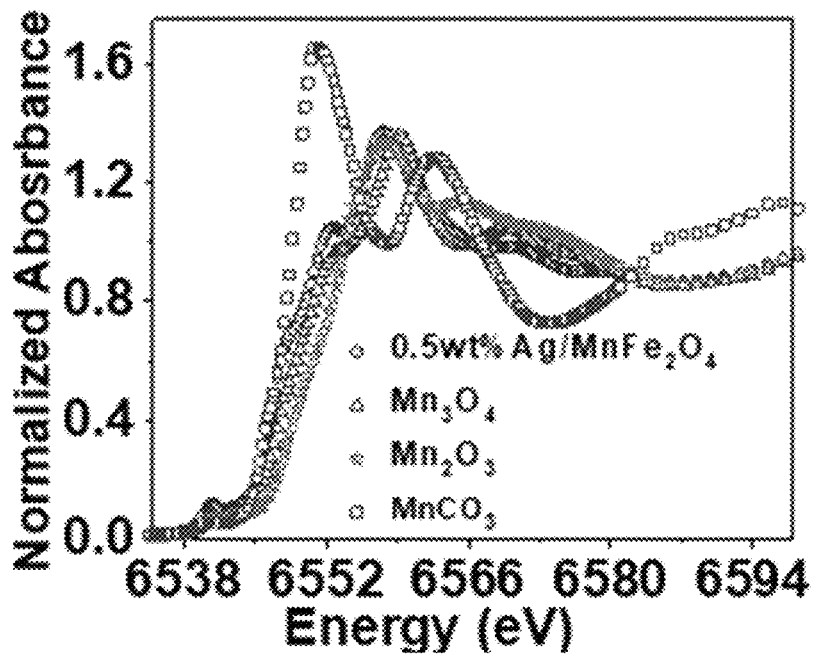
FIG. 9A is a graphical representation of XANES spectra of 0.5 wt % Ag/MnFe$_2$O$_4$ with reference spectra at Mn—K edges.
Figure 9B:
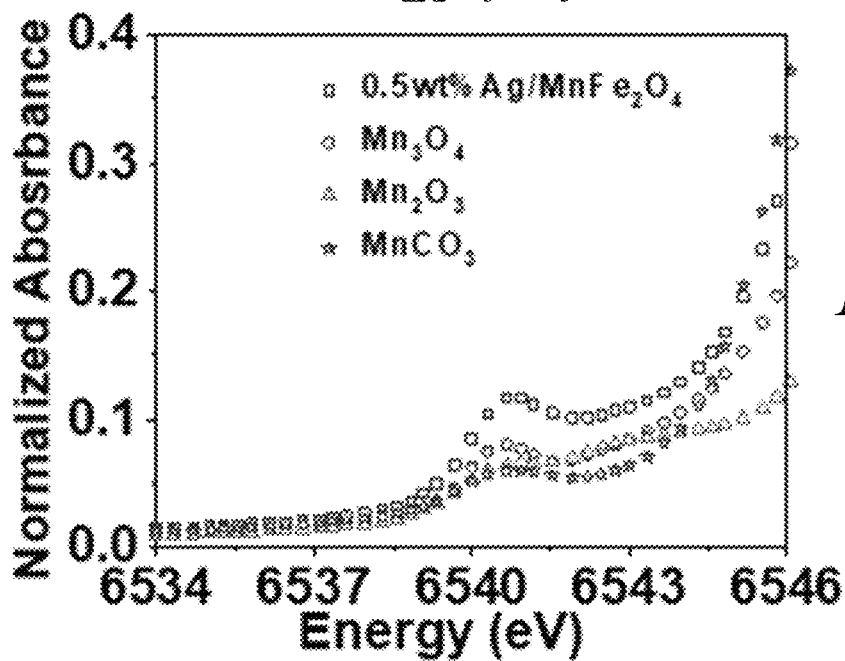
FIG. 9B is a graphical representation of XANES spectra of 0.5 wt % Ag/MnFe$_2$O$_4$ with reference spectra at Mn—K edges.

The oxidation state of the metal species in 0.5 wt % Ag/$MnFe_2O_4$ was probed by XANES measurements. As shown in the normalized spectra of K-edge XANES (FIG. 8A, FIG. 8B, FIG. 9A, and FIG. 9B), the oxidation state of Fe in both $MnFe_2O_4$ and 0.5 wt % Ag/$MnFe_2O_4$ is comparable to that of $Fe_3O_4$ (FIG. 8B). The Mn K edge spectra of 0.5 wt % Ag/$MnFe_2O_4$ are similar to that of $Mn_3O_4$, which has a mean valence of 2.67. In addition, the broadening pre-edge peaks shown in FIG. 9B suggest that the predominant manganese is in the octahedral sites, since a tetrahedral site occupancy leads to a sharper pre-edge peak. On the basis of a linear combination fitting (LCF) of Ag K edge XANES spectra, $Ag^0$ and $Ag^+$ account for 22% and 78% of Ag in the bulk catalyst, respectively. The majority $Ag^+$ can be assigned to the $Ag^+$ incorporated in the manganese ferrite structure, while the rest comes from the oxidized surface of silver ($Ag^0$) nanoparticles under ambient conditions.

Further, an EXAFS fitting was performed to obtain quantitative information on the inversion degree of the spinel manganese ferrite, and a general formula $[Mn_{0.22}Fe_{0.78}]^A$ $[Mn_{0.78}Fe_{1.22}]^B O_4$ was derived, where A and B represent the tetrahedral and octahedral sites, respectively.

Plasmon-Enhanced Catalytic Ozonation of Atrazine

Figure 10A:
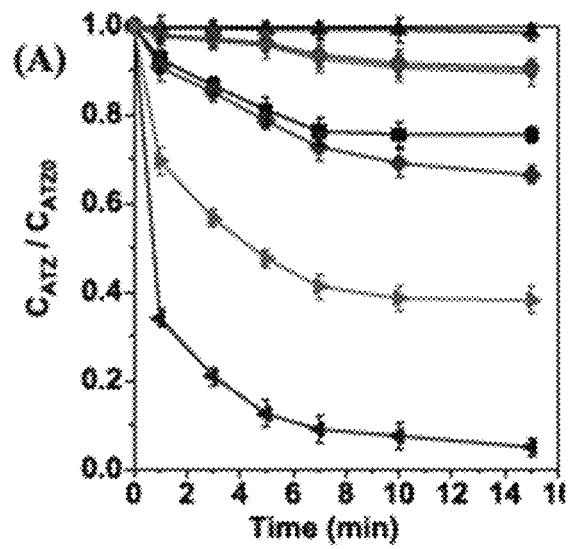
FIG. 10A is a graphical representation of atrazine (ATZ) degradation under different conditions. Ozonation is represented by ■, photolysis is represented by ●, adsorption is represented by ▲, photocatalysis is represented by ▼, photo-ozonation is represented by ♦, catalytic ozonation is represented by ▶, and plasmon-enhanced catalytic ozonation is represented by ◀. Experimental conditions: Initial ATZ concentration: 2 mg/L; initial O$_3$ concentration (when added): 2.7 mg/L; working solution: 150 mL; catalyst dose: 1.2 g/L; light source: LEDs; photon flux (when irradiated): $6.4 \times 10^{-10}$ Einstein L$^{-1}$·s$^{-1}$; pH$_0$=7.
Figure 10B:
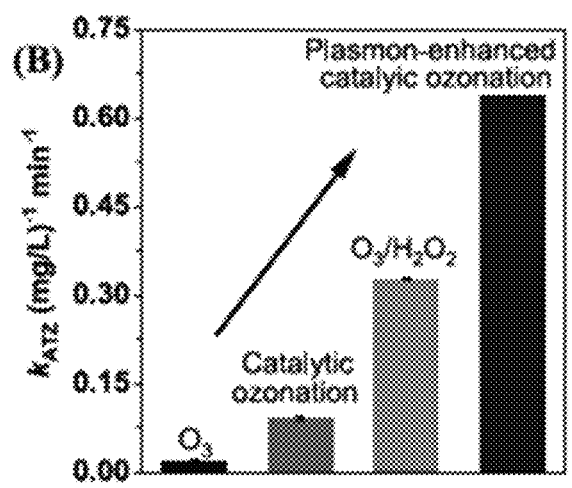
FIG. 10B is a graphical representation of ATZ degradation rates under different conditions. Experimental conditions: Initial ATZ concentration: 2 mg/L; initial O$_3$ concentration (when added): 2.7 mg/L; initial H$_2$O$_2$ concentration (when added): 1 mg/L; working solution: 150 mL; catalyst dose: 1.2 g/L; light source: LEDs; photon flux (when irradiated): $6.4 \times 10^{-10}$ Einstein L$^{-1}$·s$^{-1}$; pH$_0$=7.
Figure 10C:
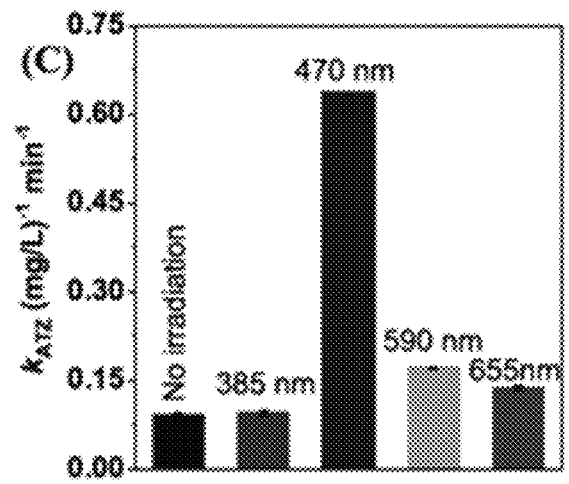
FIG. 10C is a graphical representation of effects of irradiation wavelength on ATZ degradation. Experimental conditions: Initial ATZ concentration: 2 mg/L; initial O$_3$ concentration (when added): 2.7 mg/L; working solution: 150 mL; catalyst dose: 1.2 g/L; light source: LEDs; photon flux (when irradiated): $6.4 \times 10^{-10}$ Einstein L$^{-1}$·s$^{-1}$; pH$_0$=7.
Figure 11:
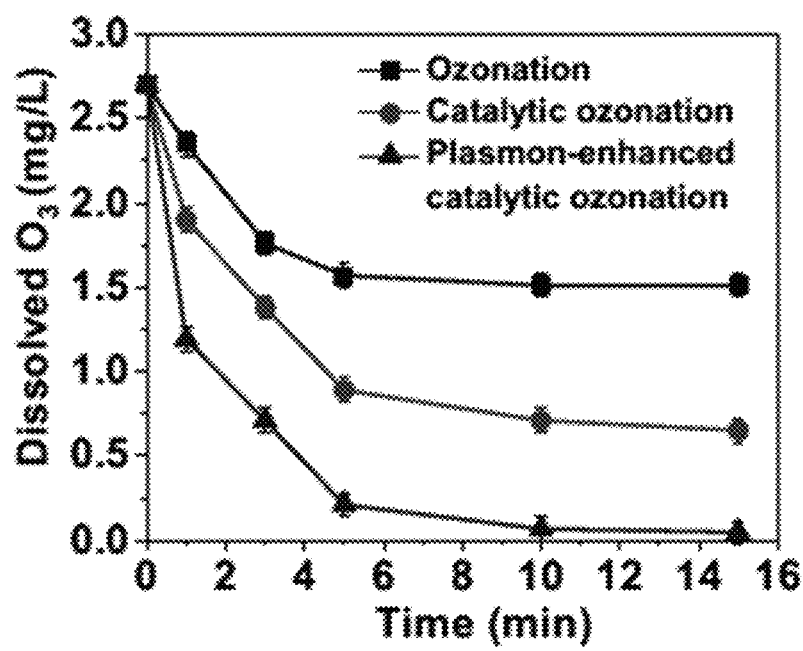
FIG. 11 is a graphical representation of dissolved O$_3$ concentrations during different ozonation processes. Ozonation is represented by ■, catalytic ozonation is represented by ●, and plasmon-enhanced catalytic ozonation is represented by ▲. Initial ATZ concentration: 2 mg/L; initial O$_3$ concentration: 2.7 mg/L; working solution: 150 mL; catalyst dose: 1.2 g/L; LED wavelength: 470 nm±10 nm; photon flux (when irradiated): $6.4 \times 10^{-10}$ Einstein L$^{-1}$·s$^{-1}$; pH$_0$=7.
Figure 12:
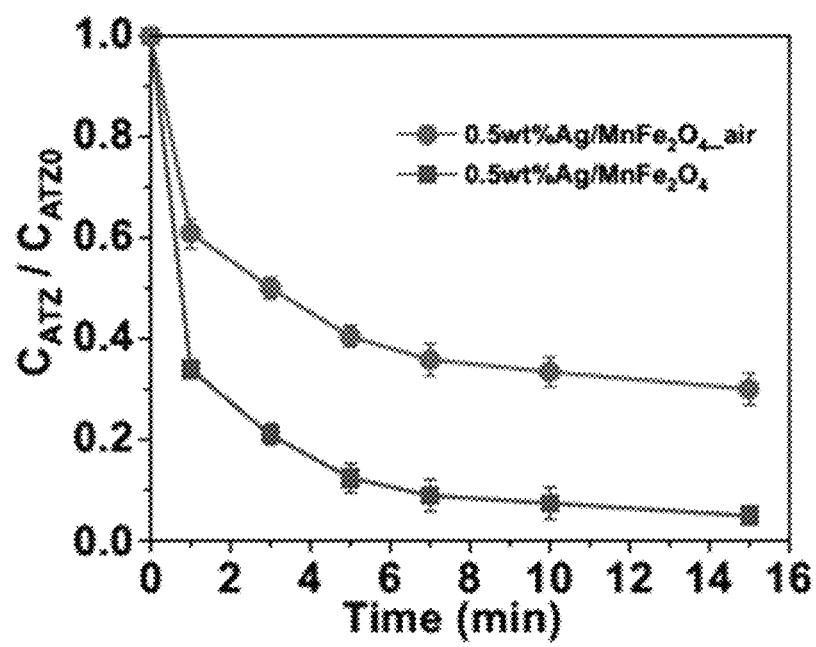
FIG. 12 is a graphical representation of ATZ degradation for different catalysts under light irradiation. 0.5% Ag/MnFe$_2$O$_4$ air is represented by ●, while 0.5% Ag/MnFe$_2$O$_4$ is represented by ■. Experimental conditions: Initial ATZ concentration: 2 mg/L; initial O$_3$ concentration: 2.7 mg/L; working solution: 150 mL; catalyst dose: 1.2 g/L; LED wavelength: 470 nm±10 nm; photon flux: $6.4 \times 10^{-10}$ Einstein L$^{-1}$·s$^{-1}$; pH$_0$=7
Figure 13:
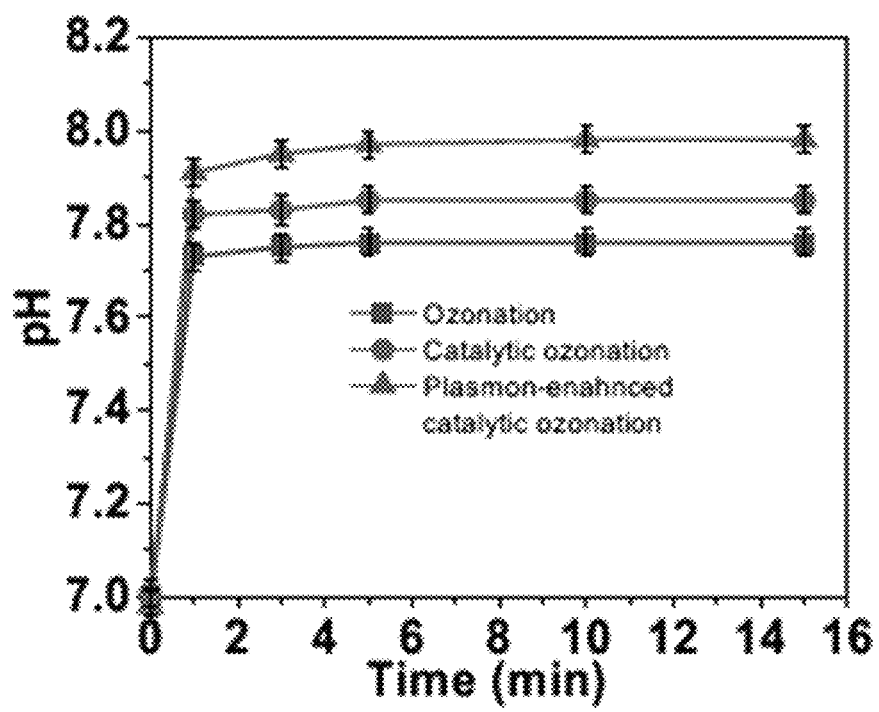
FIG. 13 is a graphical representation of the pH evolution during ozonation (■), catalytic ozonation (●), and plasmon-enhanced catalytic ozonation (▲). Initial ATZ concentration: 2 mg/L; initial O$_3$ concentration: 2.7 mg/L; working solution: 150 mL; catalyst dose: 1.2 g/L; LED wavelength: 470 nm±10 nm; photon flux (when irradiated): $6.4 \times 10^{-10}$ Einstein L$^{-1}$·s$^{-1}$; pH$_0$=7.

Results of ATZ degradation under different conditions are shown in FIG. 10A. Adsorption, photolysis, and photocatalysis exhibited limited removal efficiency (<10%). While single ozonation and photo-ozonation achieved 25-35% reduction in 10 min, approximately 60% of the ATZ was degraded with 0.5 wt % Ag/$MnFe_2O_4$ as the ozonation catalyst. However, approximately 65% of the ATZ was eliminated within 1 min, and a total removal greater than 95% was realized in 15 min with the addition of light irradiation (470 nm). The faster ATZ degradation also corresponded to a faster ozone depletion (FIG. 11), indicating the important role of efficient ozone decomposition. Various amounts (20-30 μg/L) of metal ions (i.e., Ag, Fe, or Mn) were detected at the end of experiments, which showed no effect on ATZ removal in the presence of ozone with or without light. This confirms the heterogeneous catalytic pathway as well as the stable mineralogical structure of Ag/$MnFe_2O_4$. While many radical chain reactions may be involved, the overall decay of ATZ followed a simple second-order kinetics with a rate constant KATZ of 0.091 and 0.636 $(mg/L)^{-1} \cdot min^{-1}$ for catalytic ozonation and plasmon-enhanced catalytic ozonation, respectively, that is, light irradiation led to a sevenfold enhancement (FIG. 10B). More notably, this degradation rate was approximately twice as fast as that of conventional $O_3/H_2O_2$, a homogeneous process, at the same ozone dose ($[H_2O_2]_0$=1 mg/L). Furthermore, the light-induced enhancement exhibited a high wavelength dependence, with the maximum achieved at the wavelength corresponding to the Ag surface plasmon band (FIG. 10C). This is a clear indication of plasmonic effects, which is also supported by the superior performance of 0.5 wt % Ag/$MnFe_2O_4$ compared with that of 0.5 wt % Ag/$MnFe_2O_4$_air under light irradiation (FIG. 12). The volumetric photon flux dosed into the solution was only $6.4 \times 10^{-10}$ Einstein $L^{-1} \cdot s^{-1}$, which is several orders of magnitude lower than those typically used in photocatalytic ozonation ($10^{-5}$-$10^{-8}$ Einstein $L^{-1} \cdot s^{-1}$). Further, the solar flux is approximately $6 \times 10^{-3}$ Einstein $m^{-2} \cdot s^{-1}$ with approximately 7.6% between 450 and 500 nm. Thus, without considering other interferences and limitations of environmental matrices, the intensity of the sunlight impinging on 1 $m^2$ of earth may drive the catalytic ozone decomposition mediated by Ag localized surface plasmon resonance (LSPR) for the treatment of >100 $m^3$ water, demonstrating the great potential of plasmon-enhanced catalytic ozonation as an energy-efficient AOP for water purification. The pH evolution during the experiments was shown in FIG. 13. All pH profiles exhibited a similar trend, where it quickly increased within approximately 1 min due to atrazine degradation (e.g., dealkylation) and then remained at a relatively constant value throughout the run, with the final pH varied between 7.7 and 7.9. Such a narrow pH range also confirms that the observed performance enhancement was not caused by a significant pH difference between different processes.

Figure 14C:
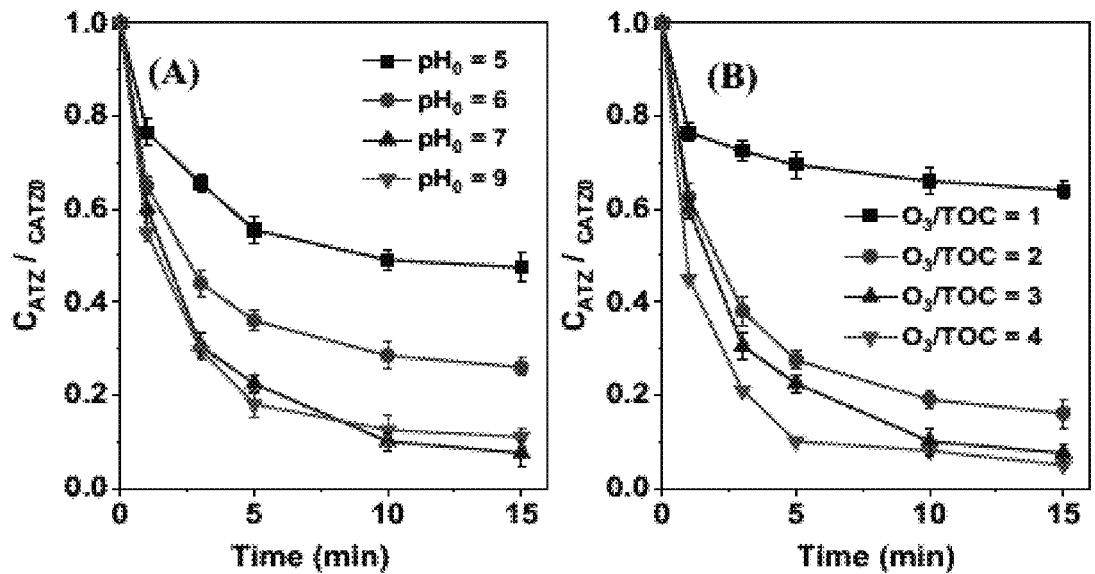
FIG. 14C is a graphical representation of the effects of catalyst dose on ATZ removal during plasmon-enhanced catalytic ozonation. LED wavelength: 470 nm±10 nm; photon flux: $4.28 \times 10^{-10}$ Einstein L$^{-1}$·s$^{-1}$. A catalyst dose of 0.6 g/L is represented by ■, catalyst dose of 0.9 g/L is represented by ●, catalyst dose of 1.2 g/L is represented by 4, and catalyst dose of 1.5 g/L is represented by ▼.
Figure 14C:
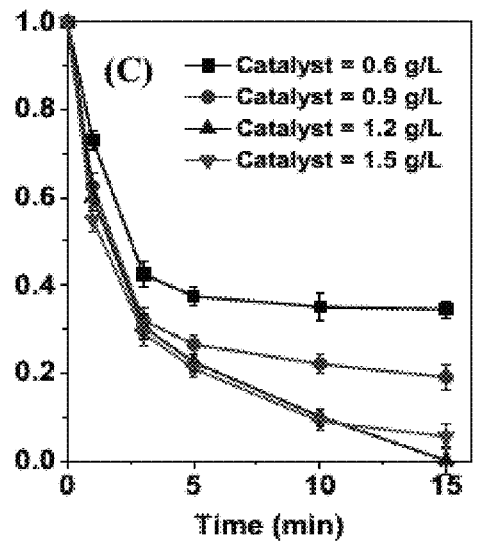

The effects of operating variables (e.g., pH, ozone/catalyst dose) were also examined, and the results are presented in FIG. 14A, FIG. 14B, and FIG. 14C. Generally a higher pH favors ozone decomposition for ·OH generation, leading to a faster ATZ degradation. However, no appreciable difference was observed for pH 7 and 9. This may be explained by the fact that 0.5 wt % $AgMnFe_2O_4$ has a $pH_{pzc}$ of 6.98 (Table 1). Catalysts usually have the maximum ozone decomposition capability when surface hydroxyl groups are mostly zero-charged, and consequently the ATZ removal efficiency was increased. As the main reactive oxidant, a higher $O_3$ dose led to a faster ATZ removal (FIG. 14B).

Similarly, a higher catalyst dose can provide more actives sites, thus enhancing the ozone decomposition and ATZ removal (FIG. 14C). However, a further increase of the catalyst dose from 1.2 to 1.5 g/L resulted in no improvement in the ATZ removal, indicating the $O_3$ dose could be the limiting factor under the experimental conditions herein.

Reactive Sites and Mechanism of Plasmon-Mediated Enhancement

Figure 15:
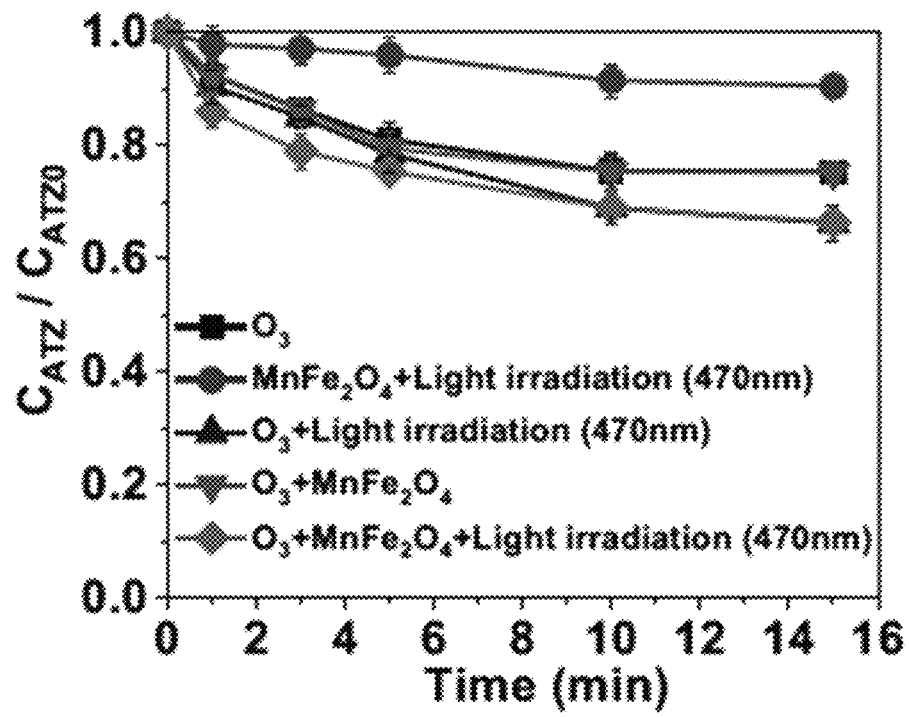
Figure 16:
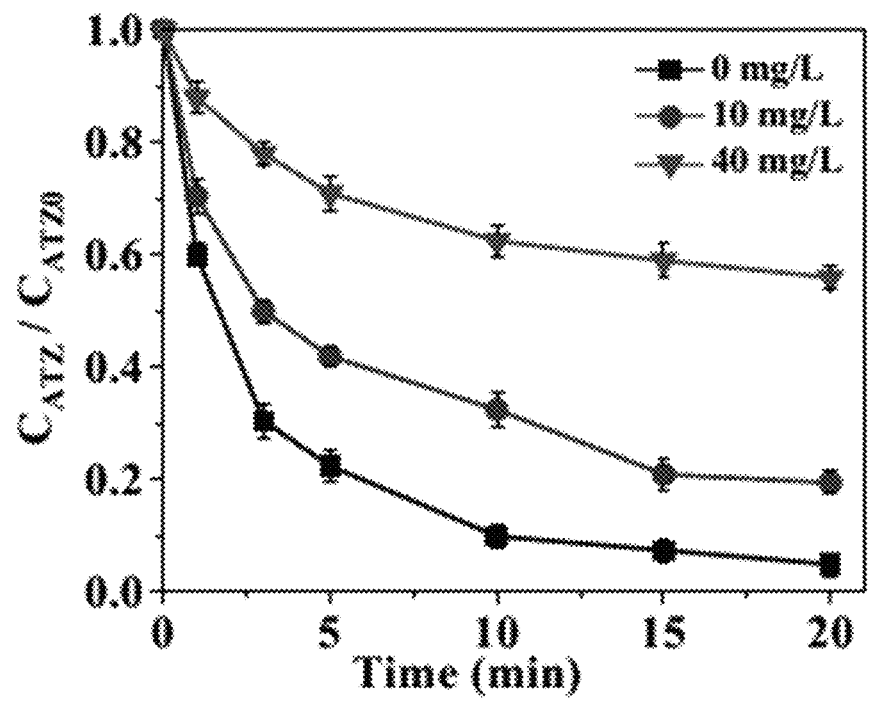
FIG. 16 is a graphical representation of phosphate effects on ATZ removal during plasmon-enhanced catalytic ozonation. Initial ATZ concentration: 2 mg/L; initial O$_3$ concentration: 2.7 mg/L; working solution: 150 mL; catalyst dose: 1.2 g/L; light source: LEDs; photon flux: $4.28 \times 10^{-10}$ Einstein L$^{-1}$·s$^{-1}$; pH$_0$=7. Phosphate at 0 mg/L is represented by ■, 10 mg/L is represented by ●, and 40 mg/L is represented by ▼.
Figure 17A:
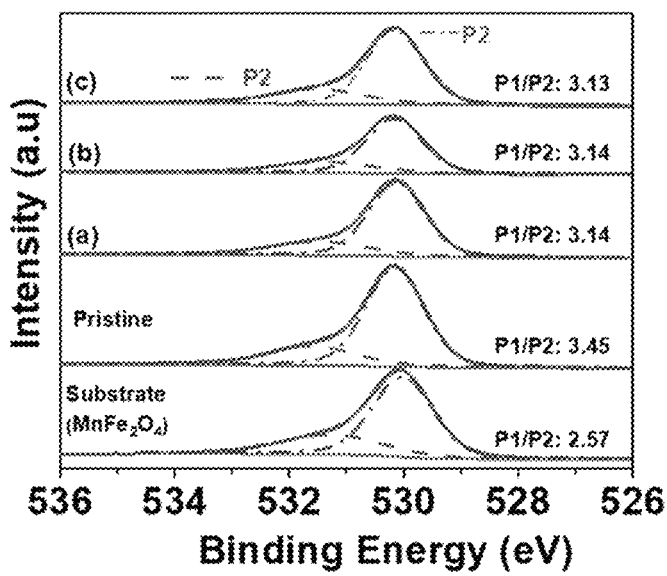
FIG. 17A is a graphical representation of O 1 s X-ray photoelectron spectroscopy (XPS) spectra of pristine and spent catalysts (0.5 wt % Ag/MnFe$_2$O$_4$) (a) after catalytic ozonation, and (b&c) after plasmon-enhanced catalytic ozonation. (b) $4.28 \times 10^{-10}$ Einstein $L^{-1} \cdot s^{-1}$, (c) $6.4 \times 10^{-10}$ Einstein $L^{-1} \cdot s^{-1}$.
Figure 17B:
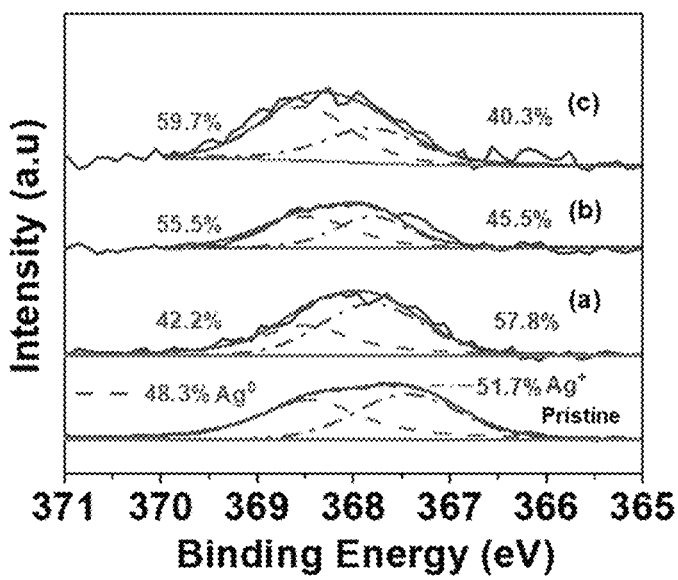
FIG. 17B is a graphical representation of Ag 3 d X-ray photoelectron spectroscopy (XPS) spectra of pristine and spent catalysts (0.5 wt % Ag/MnFe$_2$O$_4$) (a) after catalytic ozonation, and (b&c) after plasmon-enhanced catalytic ozonation. (b) $4.28 \times 10^{-10}$ Einstein $L^{-1} \cdot s^{-1}$, (c) $6.4 \times 10^{-10}$ Einstein $L^{-1} \cdot s^{-1}$.
Figure 18A:
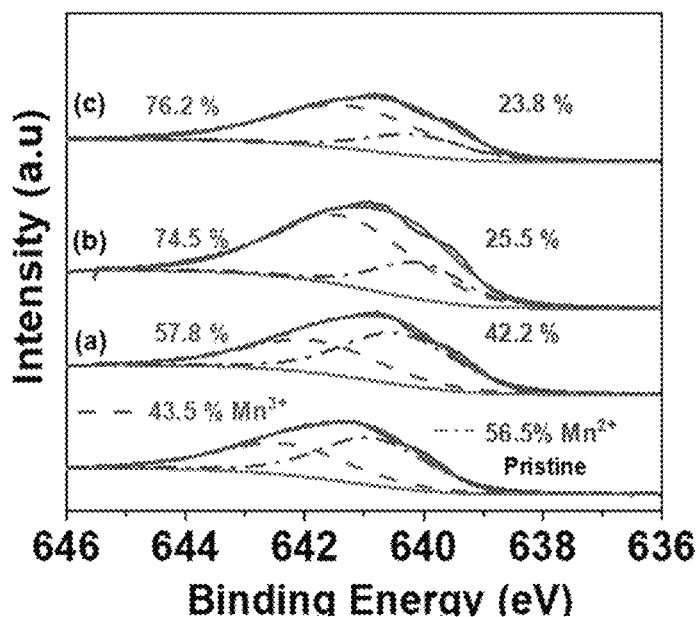
FIG. 18A is a graphical representation of Mn 2p X-ray photoelectron spectroscopy (XPS) spectra of pristine and spent catalysts (0.5 wt % Ag/MnFe$_2$O$_4$) (a) after catalytic ozonation, and (b&c) after plasmon-enhanced catalytic ozonation. (b) $4.28 \times 10^{-10}$ Einstein $L^{-1} \cdot s^{-1}$, (c) $6.4 \times 10^{-10}$ Einstein $L^{-1} \cdot s^{-1}$.
Figure 18B:
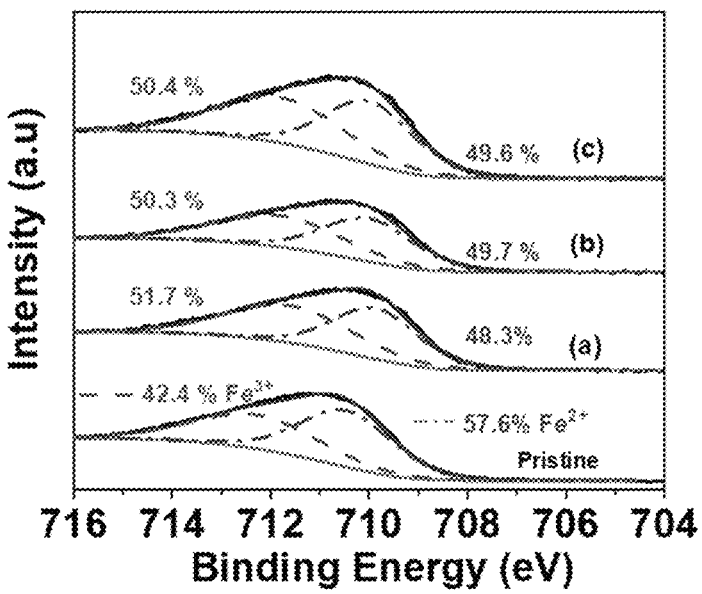
FIG. 18B is a graphical representation of Fe 2p X-ray photoelectron spectroscopy (XPS) spectra of pristine and spent catalysts (0.5 wt % Ag/MnFe$_2$O$_4$) (a) after catalytic ozonation, and (b&c) after plasmon-enhanced catalytic ozonation. (b) $4.28 \times 10^{-10}$ Einstein $L^{-1} \cdot s^{-1}$, (c) $6.4 \times 10^{-10}$ Einstein $L^{-1} \cdot s^{-1}$.

To gain a deeper understanding of the plasmon-mediated enhancement in catalytic ozonation, $MnFe_2O_4$ was tested as a control catalyst, where very limited catalytic activity was observed with or without light irradiation (FIG. 15). These results indicate the important role of $Ag/Ag_2O$. For metal-based heterogeneous catalysts, surface hydroxyl groups (—OH) and/or metal redox sites (often covered by —OH in aqueous solutions) are usually the catalytic active sites for ozone decomposition. Here the resulting inhibition on AZT removal upon addition of phosphate as a strong Lewis base to substitute the surface —OH supports such statement (FIG. 16). To further probe the possible catalytic reactive sites, XPS analysis was conducted on both pristine and used catalysts. For O 1 s spectra, the peak area ratio of $P_1$ (lattice oxygen) to $P_2$ (—OH and other surface-adsorbed O) is often used to reflect the relative abundance of different oxygen species. As shown in FIG. 17A, the $P_1/P_2$ ratio is lower for $MnFe_2O_4$ than for the Ag-doped one, indicating the abundant —OH and surface-adsorbed O in the spinel substrate (but apparently not "energetic" enough to induce an efficient $O_3$ decomposition). After reactions, the $P_1/P_2$ of 0.5 wt % $Ag/MnFe_2O_4$ decreased, meaning the consumption of lattice oxygen and/or formation of —OH or other chemisorbed oxygen. Valence changes occurred to all the metal species after reactions indicating their active involvement in the catalytic process (FIG. 17B, FIG. 18A, and FIG. 18B). In particular, the distribution of Ag and Mn species is influenced by light irradiation and further trends with the photon flux, implying the associated reactive sites are more photo-responsive. Besides being active sites for the dissociative ozone adsorption, $Ag/Ag_2O$ are characterized by the excellent mobility of charge carriers and can facilitate an efficient electron shuttling at the nearby redox sites (e.g., $Mn^{2+}/Mn^{3+}$).

Figure 19:
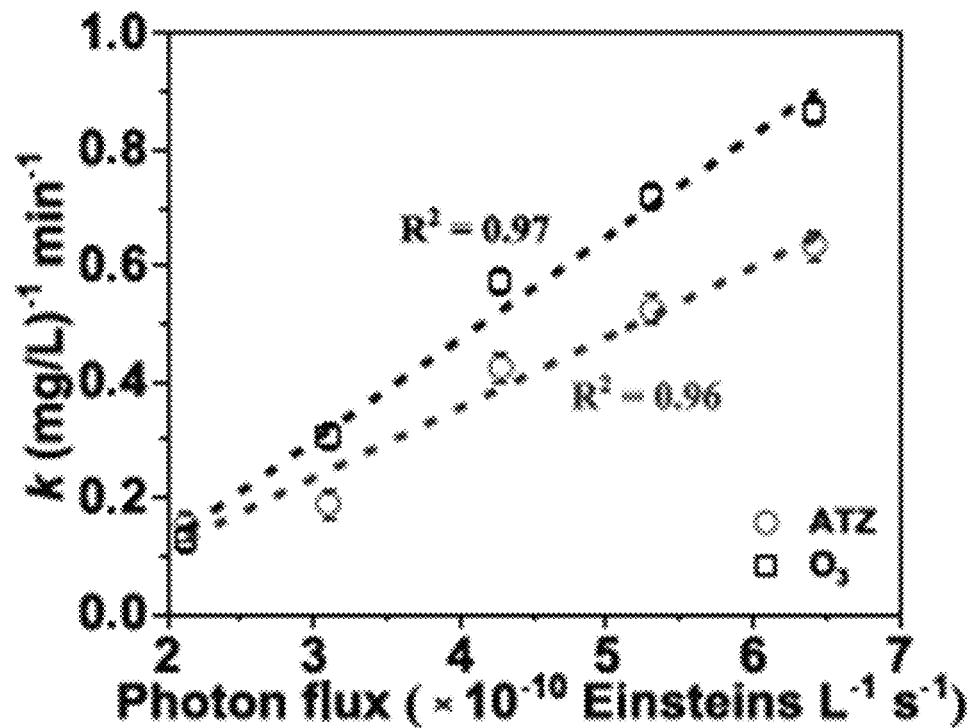
FIG. 19 is a graphical representation of reaction rate constants vs photon flux. Experimental conditions: initial ATZ concentration: 2 mg/L; initial O$_3$ concentration: 2.7 mg/L; working solution: 150 mL; catalyst dose: 1.2 g/L; light source: LEDs; $pH_0=7$. Open circles represent ATZ, while open squares represent O$_3$.

Under light irradiation at the surface plasmon band of Ag, the Ag nanoparticle acts as a nanoconcentrator through LSPR that concentrates and amplifies the incoming photon flux in small volumes surrounding the nanostructure. The decay of LSPR can lead to energy transfer from the plasmonic nanostructure to its surrounding environment or to local heating of the nanostructure, both of which may accelerate chemical reactions. It has been suggested that, for plasmon-induced heating to have a meaningful change in reaction rates, usually a very high light intensity (orders of magnitude higher than the solar flux) or an extreme thermal isolation of the nanostructure from the environment is needed. Herein, the bulk solution temperature was monitored during the experiment, and no appreciable increase was observed. Given the facts of the low photon flux, the continuous mixing of the working solution with the catalysts under ambient conditions, and the steady bulk temperature, the extent and consequent effects of local heating (if any) should be very limited. On the other hand, it was noticed that the rate constants of ozone decomposition as well as those of ATZ degradation changed proportionally to the photon flux (FIG. 19). This linear dependence is an experimental signature of charge carrier-induced chemical reactions, and other mechanisms such as heating do not exhibit this behavior. All these provide evidence that catalytic ozone decomposition was promoted mainly through the energy transfer from and not the equilibrium heating of the Ag particles.

Figure 20:
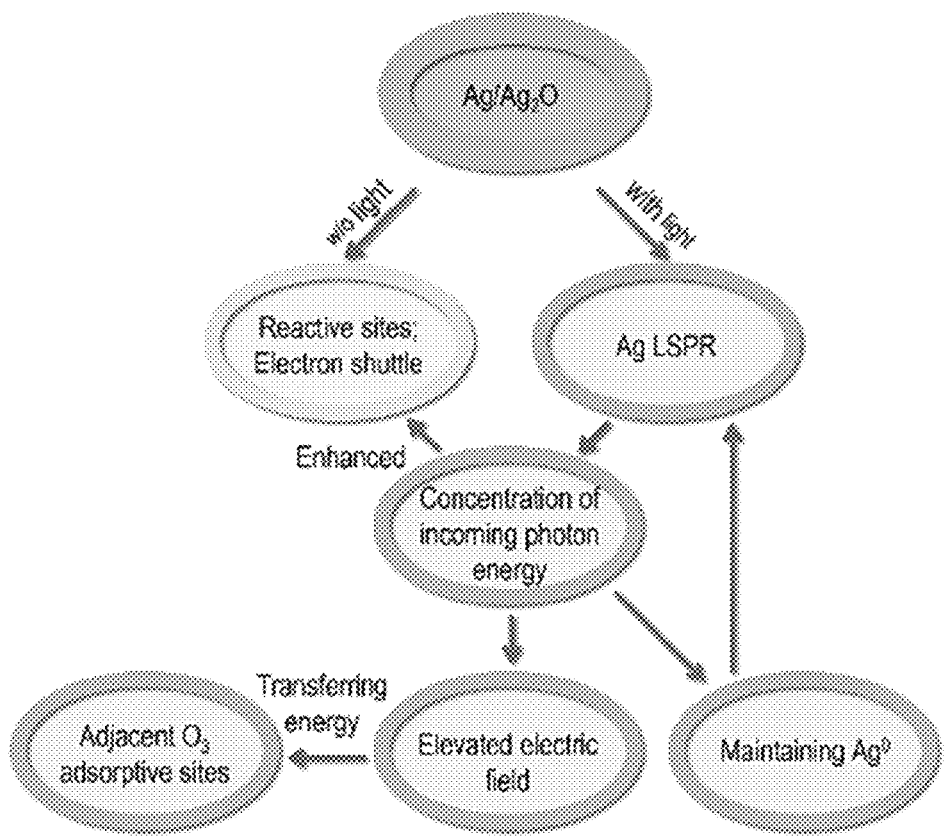
FIG. 20 is a schematic representation of plasmon-mediated enhancement of ozone decomposition.

For the catalysts used in this study, Ag nanoparticles are in direct contact with the spinel ferrite substrate. Therefore, the incoming photon energy concentrated through Ag LSPR can be transferred to the surroundings via both radiative (e.g., electromagnetic filed) and nonradiative (e.g., formation of energetic electrons) processes. The energy-transfer mechanisms by which Ag LSPR can enhance the catalytic ozone decomposition are illustrated in FIG. 20. First, $Ag/Ag_2O$ can serve as the reactive sites for ozone decomposition. Upon an excitation of LSPR, energetic electrons can be transferred to the surface-adsorbed ozone indirectly, where energetic electrons first form on the surface of Ag nanoparticles and subsequently transfer to the adsorbate ($O_3$) acceptor states, or through a direct plasmon-mediated charge scattering via the adsorbate, resulting in an enhanced ozone decomposition. Under the influence of large electric fields, the electron shuttling between $Ag/Ag_2O$ and nearby redox sites becomes much more efficient as well. The formation of $MV^{\cdot+}$ cations was only observed under light irradiation at 470 nm, which further confirms Ag plasmonic effects. Since photocatalysis only led to very limited ATZ removal (FIG. 10A), these photoejected electrons should mostly be involved in the electron-assisted ozone decomposition process directly or indirectly, during which other reactive species responsible for ATZ degradation were generated.

Figure 21A:
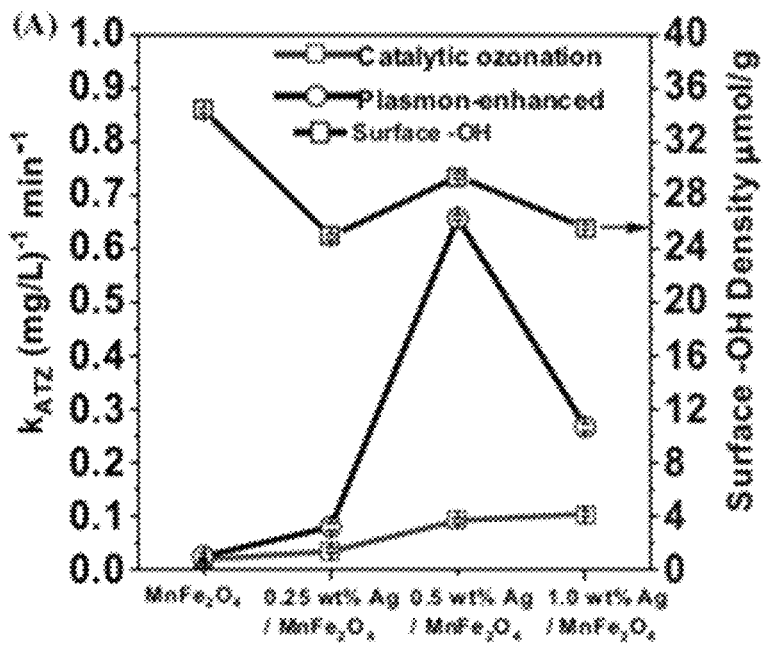
FIG. 21A is a graphical representation of a comparison of surface hydroxyl group densities and rate constants of ATZ degradation for different catalysts. Experimental conditions: Initial ATZ concentration: 2 mg/L; initial O$_3$ concentration (when added): 2.7 mg/L; working solution: 150 mL; catalyst dose: 1.2 g/L; photon flux (when irradiated): $6.4 \times 10^{-10}$ Einstein $L^{-1} \cdot s^{-1}$; $pH_0=7$. Upper data with open squares and arrow to right y axis represents surface-OH. Lower data with open circles represents plasmon-enhanced catalytic ozonation and with open squares represents catalytic ozonation and corresponds to the left y axis.
Figure 21B:
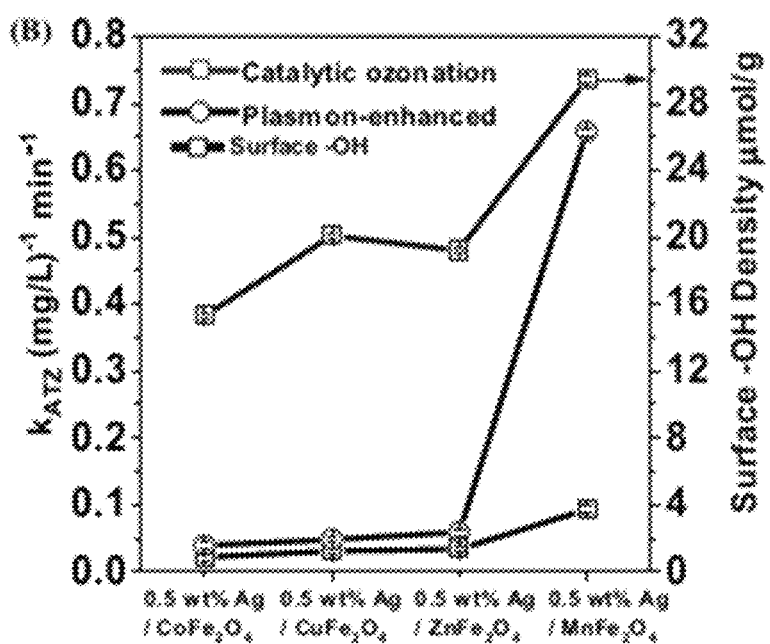
FIG. 21B is a graphical representation of a comparison of surface hydroxyl group densities and rate constants of ATZ degradation for different catalysts. Experimental conditions: Initial ATZ concentration: 2 mg/L; initial O$_3$ concentration (when added): 2.7 mg/L; working solution: 150 mL; catalyst dose: 1.2 g/L; photon flux (when irradiated): $6.4 \times 10^{-10}$ Einstein $L^{-1} \cdot s^{-1}$; $pH_0=7$. Upper data with open squares and arrow to right y axis represents surface-OH. Lower data with open circles represents plasmon-enhanced catalytic ozonation and with open squares represents catalytic ozonation and corresponds to the left y axis.

In addition to the enhanced catalytic activity at sites that are active even without light irradiation, it is thought that the elevated electric fields established through LSPR may also "activate" more ozone-adsorptive sites, which are otherwise not energetic enough to overcome the activation barriers. These sites may locate at regions of proximity of the excited plasmonic nanostructure or hot spots between Ag particles (where multiple resonances exist, yielding very strong electric fields), and they may be energized via a near-field electromagnetic mechanism or accelerated electron tunneling processes. As shown in FIG. 21A, the efficiency of ATZ removal generally increased with Ag loading for catalytic ozonation. With light irradiation, a sharp increase of KATZ was observed for 0.5 wt % $Ag/MnFe_2O_4$ as compared to 0.25 wt % $Ag/MnFe_2O_4$ and 1.0 wt % $Ag/MnFe_2O_4$. In the meantime, 0.5 wt % $Ag/MnFe_2O_4$ bears the highest surface-OH density. To minimize the effects of different particle sizes and spacings caused by different Ag loadings, several $MFe_2O_4$ (M=Co, Cu, Zn, or Mn) were also synthesized, all doped with 0.5 wt % Ag. A similar impact of surface —OH density on kATZ was observed (FIG. 21B). The significance of these results is that, while multiple factors may account for the different performance of these catalysts during catalytic ozonation, a much-pronounced light-mediated enhancement always occurred on the Ag-doped catalyst with the highest ozone-adsorptive sites, implying Ag LSPR may have channeled energy to and consequently activated more adsorptive sites to induce ozone decomposition. The excitation and decay of LSPR are sensitive to the composition, size, geometry, and the local environment of the plasmonic nanostructure.

Figure 22A:
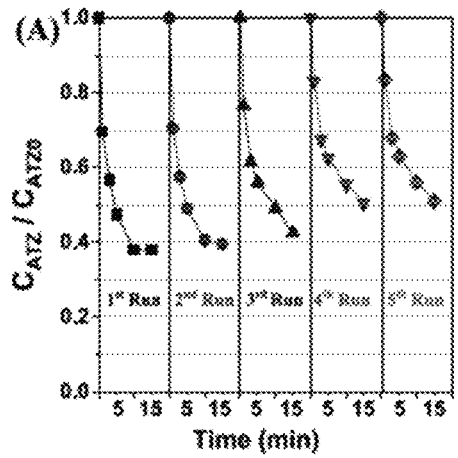
FIG. 22A is a graphical representation of cyclic runs of catalytic ozonation. Experimental conditions: initial ATZ concentration: 2 mg/L; initial O$_3$ concentration: 2.7 mg/L; working solution: 150 mL; catalyst dose: 1.2 g/L; $pH_0=7$. First run is represented by ■, second run is represented by ●, third run is represented by ▲, fourth run is represented by ▼, and fifth run is represented by ◆.
Figure 22B:
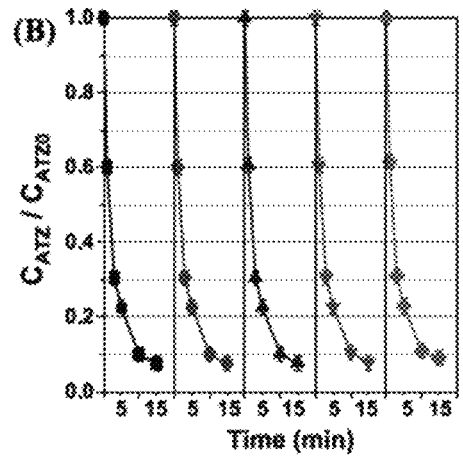
FIG. 22B is a graphical representation of cyclic runs of plasmon-enhanced catalytic ozonation. Experimental conditions: initial ATZ concentration: 2 mg/L; initial O$_3$ concentration: 2.7 mg/L; working solution: 150 mL; catalyst dose: 1.2 g/L; light source: LEDs; photon flux: $4.28 \times 10^{-10}$ Einstein $L^{-1} \cdot s^{-1}$; $pH_0=7$. First run is represented by ■, second run is represented by ●, third run is represented by ▲, fourth run is represented by ▼, and fifth run is represented by ◆.
Figure 22C:
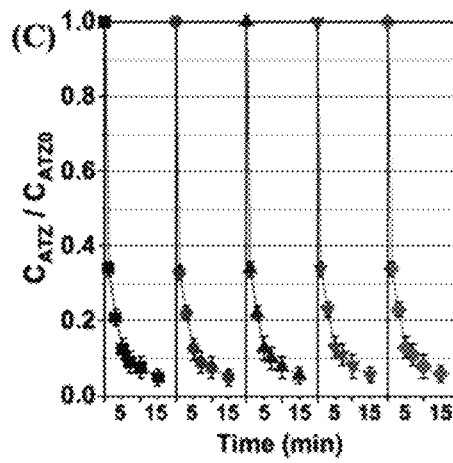
FIG. 22C is a graphical representation of cyclic runs of plasmon-enhanced catalytic ozonation. Experimental conditions: initial ATZ concentration: 2 mg/L; initial O$_3$ concentration: 2.7 mg/L; working solution: 150 mL; catalyst dose: 1.2 g/L; light source: LEDs; photon flux: $6.4 \times 10^{-10}$ Einstein $L^{-1} \cdot s^{-1}$; $pH_0=7$. First run is represented by ■, second run is represented by ●, third run is represented by ▲, fourth run is represented by ▼, and fifth run is represented by ◆.

In an oxidizing aqueous environment, $Ag^0$ tends to be oxidized easily. However, in contrast to the decreased surface $Ag^0$ content after catalytic ozonation, the surface $Ag^0$ actually increased after the plasmon-enhanced catalytic ozonation, suggesting photoreduction of the surface Ag occurred (FIG. 17B). This can be attributed to the weakening of Ag—O bonds by LSPR of the Ag core. The presence of $Ag^0$ is crucial to sustain the high catalytic performance. As illustrated in FIG. 22B and FIG. 22C, 0.5 wt % Ag/$MnFe_2O_4$ exhibited excellent stability in cyclic runs with light irradiation, whereas the performance gradually declined during catalytic ozonation without light irradiation (FIG. 22A). Even without considering the LSPR of Ag, it is believed that a mixture of Ag/$Ag_2O$ is beneficial for efficient ozone decomposition. Metal oxides have been reported to be more active toward ozone, but a decomposition that is too fast may cover the catalyst surface with stable oxygen species and therefore hinder further decomposition of ozone.

Reactive Species and Possible Ozone Decomposition Pathways

Figure 23A:
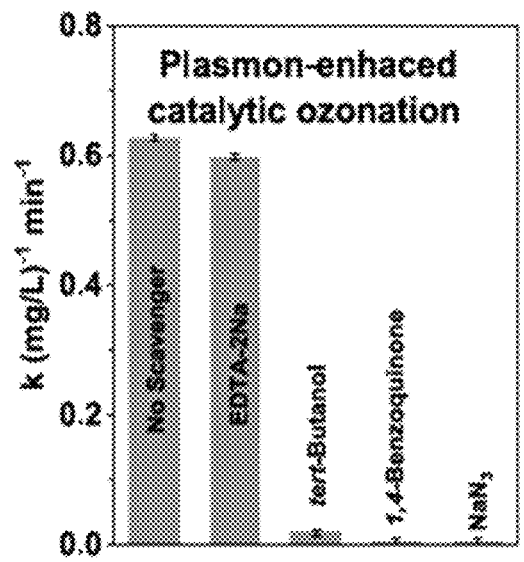
FIG. 23A is a graphical representation of effects of different scavengers on ATZ degradation for plasmon-enhanced catalytic ozonation. Concentrations were 1 mM tert-butanol, 1 mM EDTA-2Na, 0.370 mM 1.4-benzoquinone, 0.614 mM NaN$_3$.
Figure 23B:
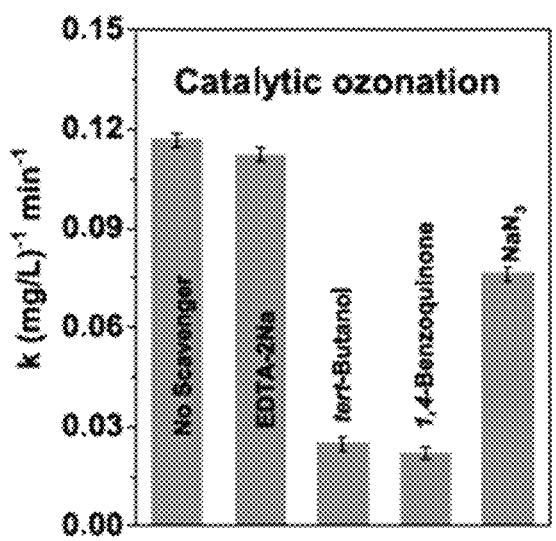
FIG. 23B is a graphical representation of effects of different scavengers on ATZ degradation for catalytic ozonation. Concentrations were 1 mM tert-butanol, 1 mM EDTA-2Na, 0.370 mM 1.4-benzoquinone, 0.614 mM NaN$_3$.
Figure 24A:
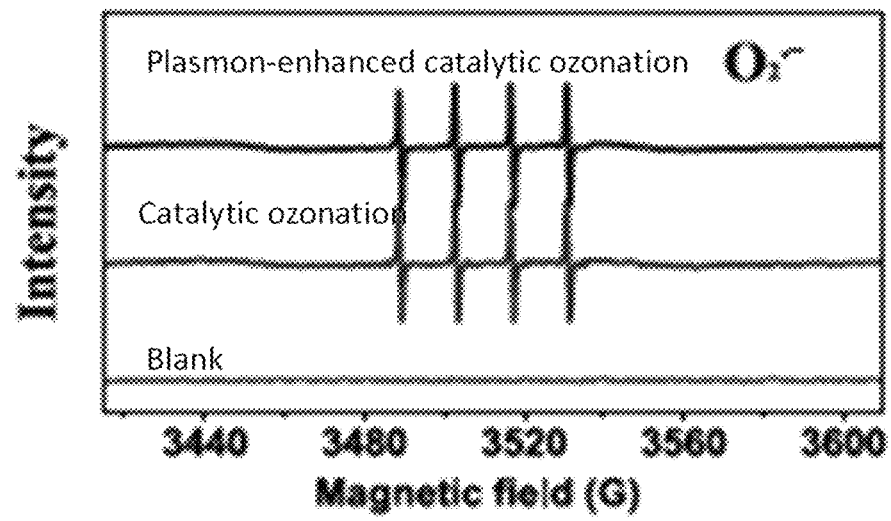
FIG. 24A is a graphical representation of EPR spectra of $O_2 \cdot^-$ reactive oxygen species. The control blank (trapping agent only) is the lowest line; catalytic ozonation is the middle line; plasmon-enhanced catalytic ozonation is the upper line.
Figure 24B:
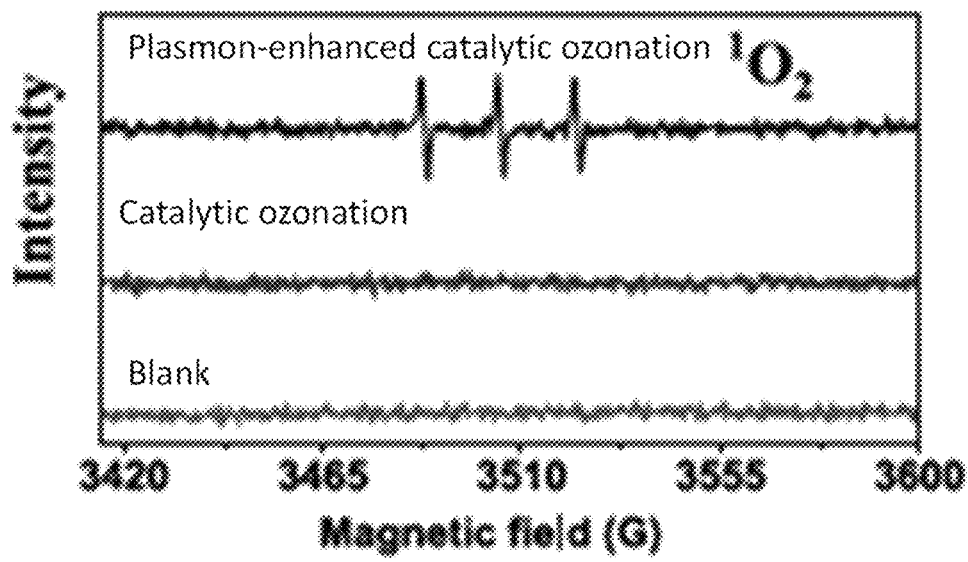
FIG. 24B is a graphical representation of EPR spectra of $^1O_2$ reactive oxygen species. The control blank (trapping agent only) is the lowest line; catalytic ozonation is the middle line; plasmon-enhanced catalytic ozonation is the upper line.

Here, a series of scavenger tests and EPR measurements were conducted to investigate the reactive species that were generated and responsible for the ATZ degradation during different catalytic ozonation processes. Here, t-BuOH, 1,4-benzoquinone, $NaN_3$, and EDTA-2Na (EDTA=ethyl-enediaminetetraacetic acid) were employed as the scavengers for ·OH, ·$O_2^-$, $^1O_2$, and $h^+$, respectively. As shown in FIG. 23A and FIG. 23B, the effect of the EDTA-2Na addition was almost negligible, indicating $h^+$ was not involved in the ATZ removal. On the contrary, both 1-BuOH and 1,4-benzoquinone inhibited ATZ degradation, implying ·OH and ·$O_2$ were generated in both processes. An addition of $NaN_3$ affected the ATZ degradation differently during the catalytic ozonation with and without light irradiation. While a significant inhibition was observed in the plasmon-enhanced process, the effect was much less pronounced in catalytic ozonation. This implies that $^1O_2$ was mainly generated under a light irradiation. Furthermore, since 1,4-benzoquinone and $NaN_3$ also have strong scavenging effects against ·OH, 5-tert-butoxycar-bonyl-5-methyl-1-pyrroline N-oxide (TBMPO) and 2,2,6,6-tetramethylpiperidine (TEMP) were employed as the spin trapping agents in electron paramagnetic resonance (EPR) experiments to further probe $O_2^{·-}$ and $^1O_2$, respectively. The characteristic EPR signals of TBMPO/$O_2^{·-}$ adducts (1:1:1:1 four-line spectra; FIG. 24A) were detected in both processes, while the characteristic EPR signals of TEMP/$^1O_2$ adducts were only detected during the plasmon-enhanced catalytic ozonation (FIG. 24B), which confirms the results of scavenger tests.

Figure 25:
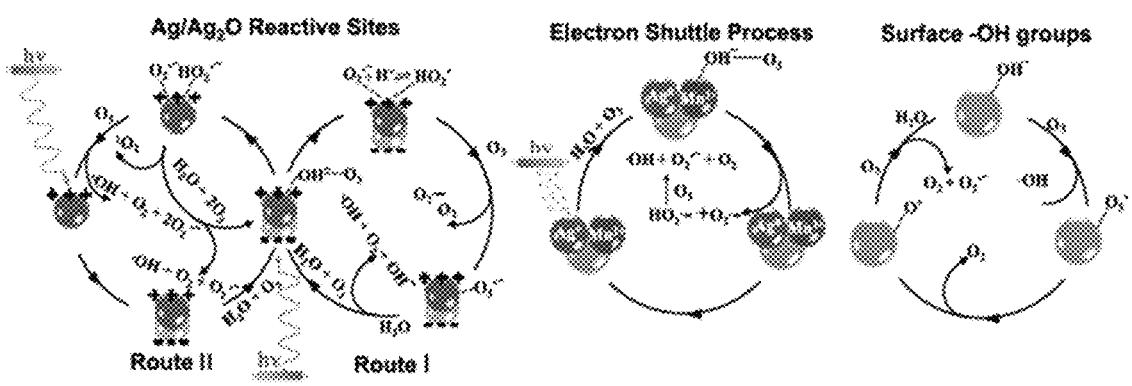
FIG. 25 is a schematic representation of catalytic ozone decomposition pathways at different adsorptive sites.

On the basis of the results and discussion above, the corresponding catalytic ozone decomposition pathways at different adsorptive sites are proposed and presented in FIG. 25. At Ag/$Ag_2O$ sites, the intense electric field generated at the surface via LSPR excitation may lead to transient electronic excitations and consequently induce ozone decomposition, during which there is no charge extraction out of Ag (Route I). Furthermore, upon plasmonic excitation, energetic charge carriers such as energized electrons can be generated and injected into the adsorbate ($O_3$), leading to the formation of surface-bound intermediates ($O_2^-$ and $HO_2$·). $O_2^·$ can then be oxidized by the paired hole through which $^1O_2$ is released and $Ag^+$ returns to $Ag^0$ (Route II). These intermediates may also react with another ozone and be desorbed from the surface, leaving the metal nanoparticle in a charged state. As discussed above, LSPR of the metal core can help restore the metal surface to the uncharged state. Besides, the superior electron transport properties of Ag can also facilitate the electron shuttling between Mn (II) and Mn (III) for efficient ozone decomposition, where LSPR of the metal core helps restore the uncharged state again. Moreover, surface hydroxyl groups on the metal-based catalysts can also be the catalytic active sites for ozone decomposition and the consequent generation of hydroxyl radical (·OH) and superoxide radical ($O_2^{·-}$). Ozone decomposition at all these adsorptive sites can be enhanced due to the plasmonic effects of Ag nanostructures. Further, as illustrated in FIG. 20, the plasmon-induced elevated field may energize more ozone-adsorptive sites and consequently enable catalytic ozone decomposition at these sites as well.

Demonstration in Tap Water

Figure 26:
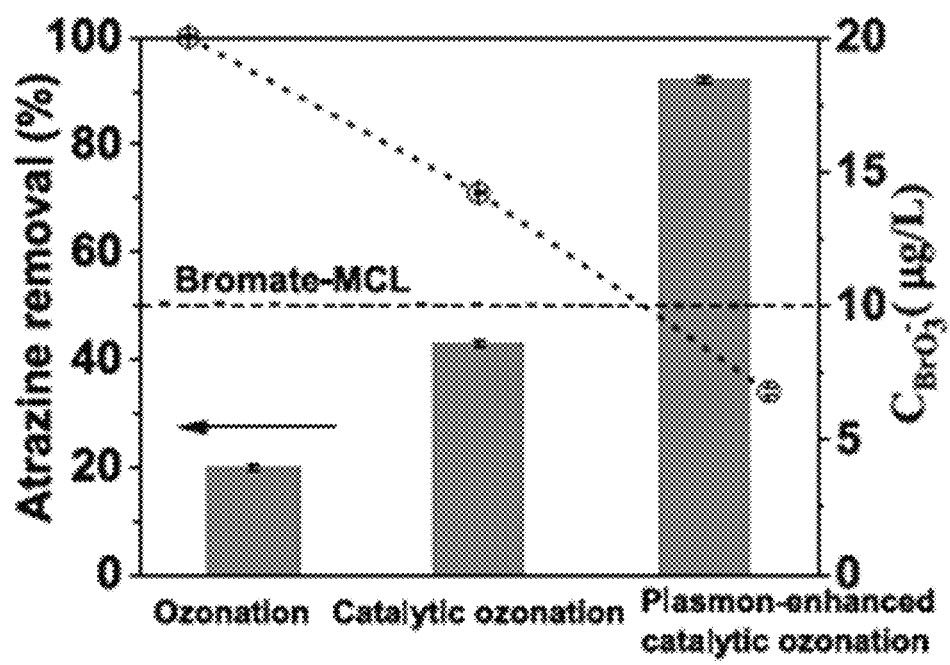
FIG. 26 is a graphical representation of ATZ removal and bromate formation in tap water. Experimental conditions: initial ATZ concentration: 30 μg/L, working solution: 150 mL, catalyst dose: 1.3 g/L, photon flux (when irradiated): $4.28 \times 10^{-10}$ Einstein $L^{-1} \cdot s^{-1}$, O$_3$/TOC (mass ratio): 0.7, reaction time: 5 min. Bar graph corresponds to the left y axis and represents the % ATZ removal, while the line graph corresponds to the right y axis and represents bromate formation (μg/L).

The high efficiency of plasmon-enhanced catalytic ozonation was demonstrated in tap water under realistic water treatment conditions. As shown in FIG. 26, 92% of ATZ removal ($C_0$=30 μg/L) was achieved in 5 min, with an $O_3$/TOC (total organic Carbon) mass ratio of 0.7 and a photon flux of $4.28×10^{-10}$ Einstein $L^{-1}·s^{-1}$ at 470 nm. Meanwhile, the formation of bromate, a typical ozonation byproduct, decreased from 20 μg/L for ozonation alone to 14.2 μg/L for catalytic ozonation and, further, down to 6.8 μg/L for plasmon-enhanced catalytic ozonation, which is lower than the maximum contaminant level (MCL; 10 μg/L) for drinking water set by the United States Environmental Protection Agency (USEPA). It is believed that this is the first study that reports plasmon-enhanced catalytic ozonation can be a very efficient AOP for the elimination of recalcitrant water pollutants. Spinel ferrite-based catalysts are very promising for practical applications, ascribed to its stable mineralogical structure with abundant ozone-adsorptive sites and magnetic property for easy separation, the facile and scalable synthesis route (nearly 100% yield), the superior performance of plasmon-enhanced catalytic ozonation with very low Ag loading (~0.1 wt % of the total catalyst mass) and photon input, and the good recyclability.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

We claim:

1. A method of water treatment, the method comprising the steps of:
   providing a plasmonic metal nanostructure catalyst, the plasmonic metal nanostructure catalyst including a substrate with plasmonic nanostructures, the substrate doped with a plasmonic metal; and
   combining the plasmonic metal nanostructure catalyst and ozone with water in a reactor vessel that is exposed to electromagnetic radiation having wavelengths of a plasmon band of the plasmonic metal nanostructure catalyst, the water containing at least one water pollutant,
   wherein the plasmonic metal nanostructure catalyst interacts with the electromagnetic radiation through excitation of localized surface plasmon resonance, such that reactive species are generated from the ozone, and such that the reactive species oxidize the at least one water pollutant and treat the water.

2. The method of claim 1, wherein the plasmonic metal nanostructure catalyst is silver-doped manganese iron oxide ($Ag/MnFe_2O_4$).

3. The method of claim 2, wherein the $Ag/MnFe_2O_4$ has 0.25-1 wt % silver (Ag) relative to manganese (Mn).

4. The method of claim 3, wherein the $Ag/MnFe_2O_4$ has 0.5 wt % Ag relative to Mn.

5. The method of claim 1, wherein the substrate is a spinel ferrite.

6. The method of claim 5, wherein the spinel ferrite is manganese iron oxide ($MnFe_2O_4$).

7. The method of claim 1, wherein the plasmonic metal is Ag.

8. The method of claim 1, wherein the electromagnetic radiation is provided to the reactor vessel from at least one lighting device.

9. The method of claim 8, wherein the lighting device comprises at least one light-emitting diode (LED).

10. The method of claim 8, wherein the lighting device comprises at least one monochromatic blue LED with a wavelength of 470 nm.

11. The method of claim 1, wherein the electromagnetic radiation is provided to the reactor vessel from sunlight.

12. The method of claim 1, wherein the reactive species are at least one of $\cdot OH$, $O_2\cdot -$, and $^1O_2$.

13. The method of claim 1, further comprising the step of determining an amount of the at least one water pollutant in at least one sample of the water during treatment.

14. The method of claim 1, further comprising the step of determining an amount of the at least one water pollutant in the water after treatment.

15. The method of claim 1, further comprising the step of removing residual ozone from the water with a quenching agent after treatment.

16. A method of oxidizing water pollutants, the method comprising the steps of:
providing a plasmonic metal nanostructure catalyst, the plasmonic metal nanostructure catalyst including a substrate with plasmonic nanostructures, the substrate doped with a plasmonic metal; and
combining the plasmonic metal nanostructure catalyst and ozone with water in a reactor vessel that is exposed to at least one LED providing 470 nm electromagnetic radiation, the water containing at least one water pollutant,
wherein the plasmonic metal nanostructure catalyst interacts with the electromagnetic radiation through excitation of localized surface plasmon resonance, such that reactive species are generated from the ozone, and such that the reactive species oxidize the at least one water pollutant and treat the water.

17. The method of claim 16, wherein the plasmonic metal nanostructure catalyst is 0.5 wt % $Ag/MnFe_2O_4$.

18. The method of claim 16, wherein the reactive species are at least one of $\cdot OH$, $O_2\cdot -$, and $^1O_2$.

19. The method of claim 16, further comprising the step of determining an amount of the at least one water pollutant in at least one sample of the water during treatment.

20. The method of claim 16, further comprising the step of determining an amount of the at least one water pollutant in the water after treatment.

21. The method of claim 16, further comprising the step of removing residual ozone from the water with a quenching agent after treatment.

22. The method of claim 21, wherein the quenching agent is sodium thiosulfate ($Na_2S_2O_3$).

* * * * *